US011004039B2

(12) United States Patent
Lee et al.

(10) Patent No.: US 11,004,039 B2
(45) Date of Patent: *May 11, 2021

(54) CABLE READER LABELING

(71) Applicant: Palantir Technologies Inc., Palo Alto, CA (US)

(72) Inventors: Brian Lee, Sunnyvale, CA (US); Joshua Goldenberg, Menlo Park, CA (US); Drew Wolpert, Berkeley, CA (US); Dan Cervelli, Mountain View, CA (US); Brit Yonge, Vienna, VA (US); Carl Freeland, Mountain View, CA (US); Tie Zhong, Palo Alto, CA (US); Gregory Martin, Oakland, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,564

(22) Filed: Dec. 6, 2019

(65) Prior Publication Data
US 2020/0111056 A1 Apr. 9, 2020

Related U.S. Application Data

(63) Continuation of application No. 15/425,854, filed on Feb. 6, 2017, now Pat. No. 10,504,067, which is a (Continued)

(51) Int. Cl.
*G06F 3/048* (2013.01)
*G06Q 10/10* (2012.01)
(Continued)

(52) U.S. Cl.
CPC ......... *G06Q 10/107* (2013.01); *G06F 3/0481* (2013.01); *G06F 3/0482* (2013.01);
(Continued)

(58) Field of Classification Search
CPC . G06Q 10/107; G06F 3/04812; G06F 3/0482; G06F 3/0481; H04L 51/22; H04L 51/18
See application file for complete search history.

(56) References Cited

U.S. PATENT DOCUMENTS 4,881,179 A 11/1989 Vincent
5,241,625 A 8/1993 Epard et al.
(Continued)

FOREIGN PATENT DOCUMENTS

AU 2013251186 11/2015
CN 102054015 5/2014
(Continued)

OTHER PUBLICATIONS

Abbey, Kristen, "Review of Google Docs," May 1, 2007, pp. 2.
(Continued)

*Primary Examiner* — Pei Yong Weng
(74) *Attorney, Agent, or Firm* — Knobbe Martens Olson & Bear LLP

(57) ABSTRACT

Various systems and methods are provided that allow reviewers to properly and timely label communications and easily view such communications. Certain systems and methods organize one or more communications in a tile layout so that reviewers can properly and timely label communications. A reviewer can hover over any of the communications to view more details regarding the communication and/or label the communication. For example, while the cursor is placed over the displayed communication, the reviewer can provide a command, such as a key command. Once the command is provided, the displayed communication is labeled with a label associated with the command.

20 Claims, 19 Drawing Sheets

Related U.S. Application Data continuation of application No. 14/332,312, filed on Jul. 15, 2014, now Pat. No. 9,565,152.

(60) Provisional application No. 61/863,792, filed on Aug. 8, 2013.

(51) Int. Cl.
*G06F 3/0481* (2013.01)
*H04L 12/58* (2006.01)
*G06F 3/0482* (2013.01)

(52) U.S. Cl.
CPC .......... *G06F 3/04812* (2013.01); *H04L 51/18* (2013.01); *H04L 51/22* (2013.01)

(56) References Cited

U.S. PATENT DOCUMENTS

| | | |
|---|---|---|
| 5,845,300 A | 12/1998 | Comer |
| 5,875,429 A | 2/1999 | Douglas |
| 5,999,911 A | 12/1999 | Berg et al. |
| 6,065,026 A | 5/2000 | Cornelia et al. |
| 6,101,479 A | 8/2000 | Shaw |
| 6,232,971 B1 | 5/2001 | Haynes |
| 6,237,138 B1 | 5/2001 | Hameluck et al. |
| 6,243,706 B1 | 6/2001 | Moreau et al. |
| 6,279,018 B1 | 8/2001 | Kudrolli et al. |
| 6,370,538 B1 | 4/2002 | Lamping et al. |
| 6,430,305 B1 | 8/2002 | Decker |
| 6,523,019 B1 | 2/2003 | Borthwick |
| 6,642,945 B1 | 11/2003 | Sharpe |
| 6,665,683 B1 | 12/2003 | Meltzer |
| 6,850,317 B2 | 2/2005 | Mullins et al. |
| 6,944,777 B1 | 9/2005 | Belani et al. |
| 6,944,821 B1 | 9/2005 | Bates et al. |
| 6,967,589 B1 | 11/2005 | Peters |
| 6,978,419 B1 | 12/2005 | Kantrowitz |
| 7,086,028 B1 | 8/2006 | Davis et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,392,254 B1 | 6/2008 | Jenkins |
| 7,441,182 B2 | 10/2008 | Beilinson et al. |
| 7,441,219 B2 | 10/2008 | Perry et al. |
| 7,627,812 B2 | 12/2009 | Chamberlain et al. |
| 7,634,717 B2 | 12/2009 | Chamberlain et al. |
| 7,716,140 B1 | 5/2010 | Nielsen et al. |
| 7,765,489 B1 | 7/2010 | Shah |
| 7,770,100 B2 | 8/2010 | Chamberlain et al. |
| 7,870,493 B2 | 1/2011 | Pall et al. |
| 7,877,421 B2 | 1/2011 | Berger et al. |
| 7,880,921 B2 | 2/2011 | Dattilo et al. |
| 7,941,336 B1 | 5/2011 | Robin-Jan |
| 7,958,147 B1 | 6/2011 | Turner et al. |
| 7,962,848 B2 | 6/2011 | Bertram |
| 7,966,199 B1 | 6/2011 | Frasher |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,073,857 B2 | 12/2011 | Sreekanth |
| 8,191,005 B2 | 5/2012 | Baier et al. |
| 8,225,201 B2 | 7/2012 | Michael |
| 8,271,461 B2 | 9/2012 | Pike et al. |
| 8,290,838 B1 | 10/2012 | Thakur et al. |
| 8,302,855 B2 | 11/2012 | Ma et al. |
| 8,312,367 B2 | 11/2012 | Foster |
| 8,392,556 B2 | 3/2013 | Goulet et al. |
| 8,527,949 B1 | 9/2013 | Pleis et al. |
| 8,620,641 B2 | 12/2013 | Farnsworth et al. |
| 8,682,696 B1 | 3/2014 | Shanmugam |
| 8,688,573 B1 | 4/2014 | Ruknoic et al. |
| 8,732,574 B2 | 5/2014 | Burr et al. |
| 8,799,313 B2 | 8/2014 | Satlow |
| 8,807,948 B2 | 8/2014 | Luo et al. |
| 8,930,874 B2 | 1/2015 | Duff et al. |
| 8,938,686 B1 | 1/2015 | Erenrich et al. |
| 8,984,390 B2 | 3/2015 | Aymeloglu et al. |
| 9,058,315 B2 | 6/2015 | Burr et al. |
| 9,165,100 B2 | 10/2015 | Begur et al. |
| 9,286,373 B2 | 3/2016 | Elliot et al. |
| 9,348,880 B1 | 5/2016 | Kramer et al. |
| 9,565,152 B2 | 2/2017 | Lee et al. |
| 10,504,067 B2 | 12/2019 | Lee et al. |
| 2001/0021936 A1 | 9/2001 | Bertram |
| 2001/0029582 A1 | 10/2001 | Goodman et al. |
| 2002/0032677 A1 | 3/2002 | Morgenthaler et al. |
| 2002/0095360 A1 | 7/2002 | Joao |
| 2002/0103705 A1 | 8/2002 | Brady |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0061132 A1 | 3/2003 | Mason et al. |
| 2003/0093755 A1 | 5/2003 | O'Carroll |
| 2003/0126102 A1 | 7/2003 | Borthwick |
| 2003/0140106 A1 | 7/2003 | Raguseo |
| 2004/0034570 A1 | 2/2004 | Davis |
| 2004/0044648 A1 | 3/2004 | Anfindsen et al. |
| 2004/0078451 A1 | 4/2004 | Dietz et al. |
| 2004/0143796 A1 | 7/2004 | Lerner et al. |
| 2004/0205492 A1 | 10/2004 | Newsome |
| 2004/0236688 A1 | 11/2004 | Bozeman |
| 2004/0236711 A1 | 11/2004 | Nixon et al. |
| 2005/0010472 A1 | 1/2005 | Quatse et al. |
| 2005/0028094 A1 | 2/2005 | Allyn |
| 2005/0039116 A1 | 2/2005 | Slack-Smith |
| 2005/0091186 A1 | 4/2005 | Elish |
| 2005/0125715 A1 | 6/2005 | Di Franco et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0074866 A1 | 4/2006 | Chamberlain et al. |
| 2006/0080139 A1 | 4/2006 | Mainzer |
| 2006/0129746 A1 | 6/2006 | Porter |
| 2006/0136513 A1 | 6/2006 | Ngo et al. |
| 2006/0143075 A1 | 6/2006 | Carr et al. |
| 2006/0155654 A1 | 7/2006 | Plessis et al. |
| 2006/0178915 A1 | 8/2006 | Chao |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0018986 A1 | 1/2007 | Hauser |
| 2007/0043686 A1 | 2/2007 | Teng et al. |
| 2007/0061752 A1 | 3/2007 | Cory |
| 2007/0094389 A1 | 4/2007 | Nussey et al. |
| 2007/0113164 A1 | 5/2007 | Hansen et al. |
| 2007/0136095 A1 | 6/2007 | Weinstein |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0245339 A1 | 10/2007 | Bauman et al. |
| 2007/0284433 A1 | 12/2007 | Domenica et al. |
| 2007/0299697 A1 | 12/2007 | Friedlander et al. |
| 2008/0016155 A1 | 1/2008 | Khalatian |
| 2008/0091693 A1 | 4/2008 | Murthy |
| 2008/0109714 A1 | 5/2008 | Kumar et al. |
| 2008/0160967 A1* | 7/2008 | Narasimhan ...... H04M 1/72583 455/414.1 |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0249820 A1 | 10/2008 | Pathria |
| 2008/0276167 A1 | 11/2008 | Michael |
| 2008/0288475 A1 | 11/2008 | Kim et al. |
| 2008/0313132 A1 | 12/2008 | Hao et al. |
| 2008/0313243 A1 | 12/2008 | Poston et al. |
| 2009/0002492 A1 | 1/2009 | Velipasalar et al. |
| 2009/0024962 A1 | 1/2009 | Gotz |
| 2009/0031401 A1 | 1/2009 | Cudich et al. |
| 2009/0043801 A1 | 2/2009 | LeClair |
| 2009/0089651 A1 | 4/2009 | Herberger et al. |
| 2009/0106178 A1 | 4/2009 | Chu |

(56) References Cited

U.S. PATENT DOCUMENTS

| | | |
|---|---|---|
| 2009/0112678 A1 | 4/2009 | Luzardo |
| 2009/0112745 A1 | 4/2009 | Stefanescu |
| 2009/0119370 A1* | 5/2009 | Stern .................. G06Q 10/107 709/206 |
| 2009/0150868 A1 | 6/2009 | Chakra et al. |
| 2009/0164934 A1 | 6/2009 | Bhattiprolu et al. |
| 2009/0177962 A1 | 7/2009 | Gusmorino et al. |
| 2009/0187546 A1 | 7/2009 | Whyte et al. |
| 2009/0199106 A1 | 8/2009 | Jonsson et al. |
| 2009/0216562 A1 | 8/2009 | Faulkner et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0307049 A1 | 12/2009 | Elliott et al. |
| 2009/0313463 A1 | 12/2009 | Pang et al. |
| 2009/0319891 A1 | 12/2009 | MacKinlay |
| 2010/0004857 A1 | 1/2010 | Pereira et al. |
| 2010/0057622 A1 | 3/2010 | Faith et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0076813 A1 | 3/2010 | Ghosh et al. |
| 2010/0098318 A1 | 4/2010 | Anderson |
| 2010/0122152 A1 | 5/2010 | Chamberlain et al. |
| 2010/0223260 A1 | 9/2010 | Wu |
| 2010/0238174 A1 | 9/2010 | Haub et al. |
| 2010/0262901 A1 | 10/2010 | DiSalvo |
| 2010/0280851 A1 | 11/2010 | Merkin |
| 2010/0306722 A1 | 12/2010 | LeHoty et al. |
| 2010/0313239 A1 | 12/2010 | Chakra et al. |
| 2010/0318924 A1 | 12/2010 | Frankel et al. |
| 2011/0047540 A1 | 2/2011 | Williams et al. |
| 2011/0074788 A1 | 3/2011 | Regan et al. |
| 2011/0093327 A1 | 4/2011 | Fordyce, III et al. |
| 2011/0099133 A1 | 4/2011 | Chang et al. |
| 2011/0107196 A1 | 5/2011 | Foster |
| 2011/0161409 A1 | 6/2011 | Nair |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0225482 A1 | 9/2011 | Chan et al. |
| 2011/0307804 A1* | 12/2011 | Spierer ................ G06Q 10/107 715/752 |
| 2012/0004894 A1 | 1/2012 | Butler |
| 2012/0022945 A1 | 1/2012 | Falkenborg et al. |
| 2012/0059853 A1 | 3/2012 | Jagota |
| 2012/0065987 A1 | 3/2012 | Farooq et al. |
| 2012/0084117 A1 | 4/2012 | Tavares et al. |
| 2012/0084184 A1 | 4/2012 | Raleigh |
| 2012/0123989 A1 | 5/2012 | Yu et al. |
| 2012/0167011 A1 | 6/2012 | Zaman et al. |
| 2012/0188252 A1 | 7/2012 | Law |
| 2012/0197657 A1 | 8/2012 | Prodanovic |
| 2012/0197660 A1 | 8/2012 | Prodanovic |
| 2012/0215784 A1 | 8/2012 | King et al. |
| 2012/0226590 A1 | 9/2012 | Love et al. |
| 2012/0266245 A1 | 10/2012 | McDougal et al. |
| 2012/0284345 A1 | 11/2012 | Costenaro et al. |
| 2012/0284670 A1 | 11/2012 | Kashik et al. |
| 2012/0304244 A1 | 11/2012 | Xie et al. |
| 2012/0323829 A1 | 12/2012 | Stokes et al. |
| 2013/0016106 A1 | 1/2013 | Yip et al. |
| 2013/0055264 A1 | 2/2013 | Burr et al. |
| 2013/0097482 A1 | 4/2013 | Marantz et al. |
| 2013/0110877 A1 | 5/2013 | Bonham et al. |
| 2013/0124567 A1 | 5/2013 | Balinsky et al. |
| 2013/0151305 A1 | 6/2013 | Akinola et al. |
| 2013/0151453 A1 | 6/2013 | Bhanot et al. |
| 2013/0166480 A1 | 6/2013 | Popescu et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0288719 A1 | 10/2013 | Alonzo |
| 2014/0089339 A1 | 3/2014 | Siddiqui et al. |
| 2014/0129936 A1 | 5/2014 | Richards et al. |
| 2014/0208281 A1 | 7/2014 | Ming |
| 2014/0222793 A1 | 8/2014 | Sadkin et al. |
| 2014/0244284 A1 | 8/2014 | Smith |
| 2014/0282166 A1 | 9/2014 | Temkin et al. |
| 2014/0358829 A1 | 12/2014 | Hurwitz |
| 2015/0026622 A1 | 1/2015 | Roaldson et al. |
| 2015/0046844 A1 | 2/2015 | Lee et al. |
| 2015/0046845 A1 | 2/2015 | Lee et al. |
| 2015/0073954 A1 | 3/2015 | Braff |
| 2015/0089353 A1 | 3/2015 | Folkening |
| 2015/0100907 A1 | 4/2015 | Erenrich et al. |
| 2015/0106379 A1 | 4/2015 | Elliot et al. |
| 2015/0186483 A1 | 7/2015 | Tappan et al. |
| 2015/0212663 A1 | 7/2015 | Papale et al. |
| 2015/0254220 A1 | 9/2015 | Burr et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |
| 2017/0139571 A1 | 5/2017 | Lee et al. |

FOREIGN PATENT DOCUMENTS

| | | |
|---|---|---|
| EP | 1672527 | 6/2006 |
| EP | 2560134 | 2/2013 |
| EP | 2835745 | 2/2015 |
| EP | 2835770 | 2/2015 |
| EP | 2993595 | 3/2016 |
| EP | 3002691 | 4/2016 |
| EP | 3009943 | 4/2016 |
| WO | WO 01/025906 | 4/2001 |
| WO | WO 2001/088750 | 11/2001 |
| WO | WO 2007/133206 | 11/2007 |
| WO | WO 2010/030913 | 3/2010 |
| WO | WO 2010/030914 | 3/2010 |
| WO | WO 2012/119008 | 9/2012 |

OTHER PUBLICATIONS

Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

Brink, Shawn, "Single-Click or Double-Click to Open an Item: How to Open Items with a Single-Click or Double-Click in Windows 7 and Windows 8", http://www.sevenforums.com/tutorials/10117-single-click-double-click-open-item.html, May 15, 2009, pp. 6.

Chaudhuri et al., "An Overview of Business Intelligence Technology," Communications of the ACM, Aug. 2011, vol. 54, No. 8.

Conner, Nancy, "Google Apps: The Missing Manual," May 1, 2008, pp. 15.

Ferreira et al., "A Scheme for Analyzing Electronic Payment Systems," Basil 1997.

Galliford, Miles, "SnagIt Versus Free Screen Capture Software: Critical Tools for Website Owners," <http://www.subhub.com/articles/free-screen-capture-software>, Mar. 27, 2008, pp. 11.

"GrabUp—What a Timesaver!" <http://atlchris.com/191/grabup/>, Aug. 11, 2008, pp. 3.

Gu et al., "Record Linkage: Current Practice and Future Directions," Jan. 15, 2004, pp. 32.

Hua et al., "A Multi-attribute Data Structure with Parallel Bloom Filters for Network Services", HiPC 2006, LNCS 4297, pp. 277-288, 2006.

JetScreenshot.com, "Share Screenshots via Internet in Seconds," <http://web.archive.org/web/20130807164204/http://www.jetscreenshot.com/>, Aug. 7, 2013, pp. 1.

(56) References Cited

OTHER PUBLICATIONS

Kwout, <http://web.archive.org/web/20080905132448/http://www.kwout.com/> Sep. 5, 2008, pp. 2.
Microsoft Windows, "Microsoft Windows Version 2002 Print Out 2," 2002, pp. 1-6.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, http://oreilly.com/digitalmedia/2006/01/01/mac-os-x-screenshot-secrets.html published Jan. 1, 2006 in 10 pages.
Schroder, Stan, "15 Ways to Create Website Screenshots," <http://mashable.com/2007/08/24/web-screenshots/>, Aug. 24, 2007, pp. 2.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Notice of Acceptance for Australian Patent Application No. 2013251186 dated Nov. 6, 2015.
Notice of Allowance for U.S. Appl. No. 12/556,318 dated Apr. 11, 2016.
Notice of Allowance for U.S. Appl. No. 14/192,767 dated Apr. 20, 2015.
Notice of Allowance for U.S. Appl. No. 14/265,637 dated Feb. 13, 2015.
Notice of Allowance for U.S. Appl. No. 14/332,306 dated Jul. 29, 2016.
Notice of Allowance for U.S. Appl. No. 14/552,336 dated Nov. 3, 2015.
Notice of Allowance for U.S. Appl. No. 14/676,621 dated Feb. 10, 2016.
Notice of Allowance for U.S. Appl. No. 14/961,481 dated May 2, 2016.
Official Communication for Australian Patent Application No. 2013251186 dated Mar. 12, 2015.
Official Communication for Australian Patent Application No. 2014210604 dated Jun. 5, 2015.
Official Communication for Australian Patent Application No. 2014210614 dated Jun. 5, 2015.
Official Communication for Canadian Patent Application No. 2831660 dated Jun. 9, 2015.
Official Communication for European Patent Application No. 12181585.6 dated Sep. 4, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14189344.6 dated Feb. 29, 2016.
Official Communication for European Patent Application No. 15188106.7 dated Feb. 3, 2016.
Official Communication for European Patent Application No. 15190307.7 dated Feb. 19, 2016.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Aug. 20, 2014.
Official Communication for Netherlands Patent Application No. 2011729 dated Aug. 13, 2015.
Official Communication for Netherlands Patent Application No. 2012438 dated Sep. 21, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 628150 dated Aug. 15, 2014.
Official Communication for New Zealand Patent Application No. 628161 dated Aug. 25, 2014.
Official Communication for U.S. Appl. No. 12/556,321 dated Feb. 25, 2016.
Official Communication for U.S. Appl. No. 12/556,321 dated Jun. 6, 2012.
Official Communication for U.S. Appl. No. 12/556,321 dated Dec. 7, 2011.
Official Communication for U.S. Appl. No. 12/556,321 dated Jul. 7, 2015.
Official Communication for U.S. Appl. No. 13/669,274 dated May 2, 2016.
Official Communication for U.S. Appl. No. 13/669,274 dated Aug. 26, 2015.
Official Communication for U.S. Appl. No. 13/669,274 dated May 6, 2015.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 14/102,394 dated Mar. 27, 2014.
Official Communication for U.S. Appl. No. 14/108,187 dated Apr. 17, 2014.
Official Communication for U.S. Appl. No. 14/108,187 dated Mar. 20, 2014.
Official Communication for U.S. Appl. No. 14/135,289 dated Apr. 16, 2014.
Official Communication for U.S. Appl. No. 14/135,289 dated Jul. 7, 2014.
Official Communication for U.S. Appl. No. 14/192,767 dated Sep. 24, 2014.
Official Communication for U.S. Appl. No. 14/192,767 dated May 6, 2014.
Official Communication for U.S. Appl. No. 14/196,814 dated Aug. 13, 2014.
Official Communication for U.S. Appl. No. 14/222,364 dated Dec. 9, 2015.
Official Communication for U.S. Appl. No. 14/225,006 dated Sep. 2, 2015.
Official Communication for U.S. Appl. No. 14/265,637 dated Sep. 26, 2014.
Official Communication for U.S. Appl. No. 14/268,964 dated Jul. 11, 2014.
Official Communication for U.S. Appl. No. 14/289,596 dated Aug. 5, 2015.
Official Communication for U.S. Appl. No. 14/332,306 dated May 20, 2016.
Official Communication for U.S. Appl. No. 14/479,160 dated Apr. 20, 2016.
Official Communication for U.S. Appl. No. 14/552,336 dated Jul. 20, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.

(56) References Cited

OTHER PUBLICATIONS

Official Communication for U.S. Appl. No. 14/571,098 dated Aug. 5, 2015.
Official Communication for U.S. Appl. No. 14/715,834 dated Apr. 13, 2016.
Official Communication for U.S. Appl. No. 14/715,834 dated Feb. 19, 2016.
Official Communication for U.S. Appl. No. 14/741,256 dated Feb. 9, 2016.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/800,447 dated Jun. 6, 2016.
Official Communication for U.S. Appl. No. 14/841,338 dated Feb. 18, 2016.
Official Communication for U.S. Appl. No. 14/842,734 dated Nov. 19, 2015.
Official Communication for U.S. Appl. No. 14/871,465 dated Apr. 11, 2016.
Official Communication for U.S. Appl. No. 14/871,465 dated Feb. 9, 2016.
Official Communication for U.S. Appl. No. 14/883,498 dated Mar. 17, 2016.
Official Communication for U.S. Appl. No. 14/883,498 dated Dec. 24, 2015.
Official Communication for U.S. Appl. No. 14/961,481 dated Mar. 2, 2016.
Official Communication for U.S. Appl. No. 14/975,215 dated May 19, 2016.
Notice of Allowance for U.S. Appl. No. 14/332,312 dated Sep. 26, 2016.
Official Communication for European Patent Application No. 14180321.3 dated May 12, 2017.
Official Communication for European Patent Application No. 14180321.3 dated May 9, 2016.
Official Communication for U.S. Appl. No. 14/332,312 dated Jul. 18, 2016.
Official Communication for U.S. Appl. No. 14/473,860 dated Nov. 4, 2014.
Official Communication for U.S. Appl. No. 14/225,006 dated Dec. 21, 2015.
Official Communication for U.S. Appl. No. 15/331,539 dated Feb. 7, 2019.
Official Communication for U.S. Appl. No. 15/331,539 dated Apr. 8, 2019.
"Single-Click or Double-Click to Open an Item—Windows 7 Help Forums," May 15, 2009, retrieved from http://www.sevenforums.com/tutorial/10117-single-click-double-click-open-item.html.
Official Communication for U.S. Appl. No. 15/331,539 dated Jul. 12, 2019.

* cited by examiner

| READER | | | |
|---|---|---|---|
| KIDNAPPING OF CIA BEIRUT STATION CHIEF | SHOOTING OF CANDIDATE LINKED TO TALIBAN | HEZBOLLAH FIGHTERS HELPING SYRIAN TROOPS | DISPUTE OVER JUBALAND CONTINUES |
| CIA Beirut Station Chief John Smith was kidnapped at 7:53pm local time as he was walking home. No group has... | Taliban claimed responsibility for shooting of Pakistan legislative candidate Sadiq Zaman Khattak. The... | Rebels are being pushed further north by Assad's troops with the help of Hezbollah fighters. Horns and... | While the recently created Jubaland state has established a successful electoral process, rival groups are... |
| Document FDE 123/156747-12 | Document FDE 123/156747-13 | Document FDE 123/156747-14 | Document FDE 123/156747-15 |
| UNREST AS INFLATION REACHES 30 PERCENT | ISI BEHIND THURSDAY'S MARKET ATTACK | SIEGE AT BOSNIAN PARLIAMENT ENDS | DOGS TO BE BANNED FROM PUBLIC AREAS |
| The populace has shown further unrest over rising inflation in Iran. The economy was at issue in today's... | Informants suggest the ISI planned and carried out Thursday's attack in the Karrada district. While it is... | Witnesses suggest about 1500 legislators and other employees were freed from parliament Friday morning... | Iranian lawmakers may ban dogs from being walked in public. The law may also ban dogs from being driven... |
| Document FDE 123/156747-16 | Document FDE 123/156747-17 | Document FDE 123/156747-18 | Document FDE 123/156747-19 |
| MERS CLAIMS ONE MORE VICTIM | MISSILES ORIGINATED IN SYRIA | INDIAN TROOPS FIRED ON IN KASHMIR | SIDES UNCOMMITTED TO PEACE TALKS |
| A man in Ra's al Khafji that contracted MERS-Cov a week ago has died. No reports as to the whereabouts of... | Missiles that hit Israeli territory appear to have originated in Syria. Bashar Assad blames rebels for firing the... | The Indian military claims their troops were fired on by Pakistani forces in Kashmir. Pakistan denies any such... | The Syrian rebels appear unwilling to engage in peace talks with Assad's regime. Rebel leaders suggest that... |
| Document FDE 123/156747-20 | Document FDE 123/156747-21 | Document FDE 123/156747-22 | Document FDE 123/156747-23 |

| BOSNIA | 96 | 1 | PAKISTAN | 312 | 3 | IRAQ | 155 | 5 |
|---|---|---|---|---|---|---|---|---|
| SOMALIA | 243 | 2 | IRAN | 291 | 4 | SYRIA | 349 | 6 |

| READER — 210a | 210b | 210c | 210d |
|---|---|---|---|
| KIDNAPPING OF CIA BEIRUT STATION CHIEF | SHOOTING OF CANDIDATE LINKED TO TALIBAN | HEZBOLLAH FIGHTERS HELPING SYRIAN TROOPS | DISPUTE OVER JUBALAND CONTINUES |
| CIA Beirut Station Chief John Smith was kidnapped at 7:53pm local time as he was walking home. No group has... | Taliban claimed responsibility for shooting of Pakistan legislative candidate Sadiq Zaman Khattak. The... | Rebels are being pushed further north by Assad's troops with the help of Hezbollah fighters. Horns and... | While the recently created Jubaland state has established a successful electoral process, rival groups are... |
| Document FDE 123/156747-12 | Document FDE 123/156747-13 | Document FDE 123/156747-14 | Document FDE 123/156747-15 |
| UNREST AS INFLATION REACHES 30 PERCENT (210e) | ISI BEHIND THURSDAY'S MARKET ATTACK | SIEGE AT BOSNIAN PARLIAMENT ENDS (210g) | DOGS TO BE BANNED FROM PUBLIC AREAS (210h) |
| The populace has shown further unrest over rising inflation in Iran. The economy was at issue in today's... | Informants suggest the ISI planned and carried out Thursday's attack in the Karrada district. While it is... | Witnesses suggest about 1500 legislators and other employees were freed from parliament Friday morning... (320) | Iranian lawmakers may ban dogs from being walked in public. The law may also ban dogs from being driven... |
| Document FDE 123/156747-16 (210f) | Document FDE 123/156747-17 | Document FDE 123/156747-18 | Document FDE 123/156747-19 |
| MERS CLAIMS ONE MORE VICTIM (210i) | MISSILES ORIGINATED IN SYRIA | INDIAN TROOPS FIRED ON IN KASHMIR (210j) | SIDES UNCOMMITTED TO PEACE TALKS (210k) |
| A man in Ra's al Khafji that contracted MERS-Cov a week ago has died. No reports as to the whereabouts of... | Missiles that hit Israel territory appear to have originated in Syria. Bashar Assad blames rebels for firing the... | The Indian military claims their troops were fired on by Pakistani forces in Kashmir. Pakistan denies any such... | The Syrian rebels appear unwilling to engage in peace talks with Assad's regime. Rebel leaders suggest that... |
| Document FDE 123/156747-20 (210j) | Document FDE 123/156747-21 | Document FDE 123/156747-22 | Document FDE 123/156747-23 |

| BOSNIA | 96 | 1 | PAKISTAN | 312 | 3 | IRAQ | 155 | 5 |
| SOMALIA | 243 | 2 | IRAN | 291 | 4 | SYRIA | 349 | 6 |

(200, 205, 212)

READER

KIDNAPPING OF CIA BEIRUT STATION CHIEF

CIA Beirut Station Chief John Smith was kidnapped at 7:53pm local time as he was walking home. No group has...

Document
FDE 123/156747-12

SHOOTING OF CANDIDATE LINKED TO TALIBAN

Taliban claimed responsibility for shooting of Pakistani legislative candidate Sadiq Zaman Khattak. The...

Document
FDE 123/156747-13

HEZBOLLAH FIGHTERS HELPING SYRIAN TROOPS

Rebels are being pushed further north by Assad's troops with the help of Hezbollah fighters. Homs and...

Document
FDE 123/156747-14

DISPUTE OVER JUBALAND CONTINUES

While the recently created Jubaland state has established a successful electoral process, rival ...

Document
FDE ...

UNREST AS INFLATION REACHES 30 PERCENT

The populace has shown further unrest over rising inflation in Iran. The economy was at issue in today's...

Document
FDE 123/156747-16

ISI BEHIND THURSDAY'S MARKET ATTACK

Informants suggest the ISI planned and carried out Thursday's attack in the Karrada district. While it is...

Document
FDE 123/156747-17

SIEGE AT BOSNIAN PARLIAMENT ENDS

Witnesses suggest about 1500 legislators and other employees were freed from parliament Friday morning...

Document
FDE 123/156747-18

INDIAN TROOPS FIRED ON IN KASHMIR

The Indian military claims their troops were fired on by Pakistani forces in Kashmir. Pakistan denies any such...

Document
FDE 123/156747-19

DOGS ... ROM PUBLIC AREAS

...nian lawmakers may ban dogs from being walked in public. The law may also ban dogs from being driven...

SIDES UNCOMMITTED TO PEACE TALKS

The Syrian rebels appear unwilling to engage in peace talks with Assad's regime. Rebel leaders suggest that...

Document
FDE 123/156747-23

MERS CLAIMS ONE MORE VICTIM

A man in Ra's al Khafji that contracted MERS-Cov a week ago has died. No reports as to the whereabouts of...

Document
FDE 123/156747-20

MISSILES ORIGINATED IN SYRIA

Missiles that hit Israel territory appear to have originated in Syria. Bashar Assad blames rebels for firing the...

Document
FDE 123/156747-21

| BOSNIA | 96 | 1 | PAKISTAN | 312 | 3 | IRAQ | 155 | 5 |
| SOMALIA | 243 | 2 | IRAN | 291 | 4 | SYRIA | 349 | 6 |

FIG. 4A

READER

KIDNAPPING OF CIA BEIRUT STATION CHIEF

CIA Beirut Station Chief John Smith was kidnapped at 7:53pm local time as he was walking home. No group has...

*Document*
FDE 123/156747-12

SHOOTING OF CANDIDATE LINKED TO TALIBAN

Taliban claimed responsibility for shooting of Pakistani legislative candidate Sadiq Zaman Khattak. The...

*Document*
FDE 123/156747-13

DISPUTE OVER JUBALAND CONTINUES

While the recently created Jubaland state has established a successful electoral process, rival...

*Document*
FDE 123/156747-14

UNREST AS INFLATION REACHES 30 PERCENT

The populace has shown further unrest over rising inflation in Iran. The economy was at issue in today's...

*Document*
FDE 123/156747-16

ISI BEHIND THURSDAY'S MARKET ATTACK

Informants suggest the ISI planned and carried out Thursday's attack in the Karrada district. While it is...

*Document*
FDE 123/156747-17

SIEGE AT BOSNIAN PARLIAMENT ENDS

Witnesses suggest about 1500 legislators and other employees were freed from parliament Friday morning...

*Document*
FDE 123/156747-18

DOGS ... ROM PU(B)LIC AREAS

...nian lawmakers may ban dogs from being walked in public. The law may also ban dogs from being driven...

*Document*
FDE ...

SIDES UNCOMMITTED TO PEACE TALKS

The Syrian rebels appear unwilling to engage in peace talks with Assad's regime. Rebel leaders suggest that...

*Document*
FDE 123/156747-19

MERS CLAIMS ONE MORE VICTIM

A man in Ra's al Khafji that contracted MERS-Cov a week ago has died. No reports as to the whereabouts of...

*Document*
FDE 123/156747-20

MISSILES ORIGINATED IN SYRIA

Missiles that hit Israel territory appear to have originated in Syria. Bashar Assad blames rebels for firing the...

*Document*
FDE 123/156747-21

INDIAN TROOPS FIRED ON IN KASHMIR

The Indian military claims their troops were fired on by Pakistani forces in Kashmir. Pakistan denies any such...

*Document*
FDE 123/156747-22

| BOSNIA | 96 | 1 | PAKISTAN | 312 | 3 | IRAQ | 155 | 5 |
| SOMALIA | 243 | 2 | IRAN | 291 | 4 | SYRIA | 349 | 6 |

READER — 210a

| 210a | 210b | 210c | 210d |
|---|---|---|---|
| KIDNAPPING OF CIA BEIRUT STATION CHIEF | SHOOTING OF CANDIDATE LINKED TO TALIBAN | HEZBOLLAH FIGHTERS HELPING SYRIAN TROOPS | DISPUTE OVER JUBALAND CONTINUES |
| CIA Beirut Station Chief John Smith was kidnapped at 7:53pm local time as he was walking home. No group has... | Taliban claimed responsibility for shooting of Pakistan legislative candidate Sadiq Zaman Khattak. The... | Rebels are being pushed further north by Assad's troops with the help of Hezbollah fighters. Horns and... | While the recently created Jubaland state has established a successful electoral process, rival groups are... |
| *Document* FDE 123/156747-12 | *Document* FDE 123/156747-13 | *Document* FDE 123/156747-14 | *Document* FDE 123/156747-15 |
| UNREST AS INFLATION REACHES 30 PERCENT | ISI BEHIND THURSDAY'S MARKET ATTACK | SIEGE AT BOSNIAN PARLIAMENT ENDS | DOGS TO BE BANNED FROM PUBLIC AREAS |
| The populace has shown further unrest over rising inflation in Iran. The economy was at issue in today's... | Informants suggest the ISI planned and carried out Thursday's attack in the Karrada district. While it is... | Witnesses suggest about 1500 legislators and other employees were freed from parliament Friday morning... | Iranian lawmakers may ban dogs from being walked in public. The law may also ban dogs from being driven... |
| *Document* FDE 123/156747-16 | *Document* FDE 123/156747-17 | *Document* FDE 123/156747-18 | *Document* FDE 123/156747-19 |
| MERS CLAIMS ONE MORE VICTIM | MISSILES ORIGINATED IN SYRIA | INDIAN TROOPS FIRE IN KASHMIR | SIDES UNCOMMITTED TO PEACE TALKS |
| A man in Ra's al Khafji that contracted MERS-Cov a week ago has died. No reports as to the whereabouts of... | Missiles that hit Israel territory appear to have originated in Syria. Bashar Assad blames rebels for firing the... | The Indian military claims their troops were fired on by Pakistani forces in Kashmir. Pakistan denies any such... | The Syrian rebels appear unwilling to engage in peace talks with Assad's regime. Rebel leaders suggest that... |
| *Document* FDE 123/156747-20 | *Document* FDE 123/156747-21 | *Document* FDE 123/156747-22 | *Document* FDE 123/156747-23 |

| BOSNIA | 96 | 1 | PAKISTAN | 312 | 3 | IRAQ | 155 | 5 |
| SOMALIA | 243 | 2 | IRAN | 291 | 4 | SYRIA | 349 | 6 |

READER

| KIDNAPPING OF CIA BEIRUT STATION CHIEF | SHOOTING OF CANDIDATE LINKED TO TALIBAN | HEZBOLLAH FIGHTERS HELPING SYRIAN TROOPS | DISPUTE OVER JUBALAND CONTINUES |
|---|---|---|---|
| CIA Beirut Station Chief John Smith was kidnapped at 7:53pm local time as he was walking home. No group has... | Taliban claimed responsibility for shooting of Pakistan legislative candidate Sadiq Zaman Khattak. The... | Rebels are being pushed further north by Assad's troops with the help of Hezbollah fighters. Homs and... | While the recently created Jubaland state has established a successful electoral process, rival... |
| *Document* FDE 123/156747-12 | *Document* FDE 123/156747-13 | *Document* FDE 123/156747-14 | *Document* FDE... |

| UNREST AS INFLATION REACHES 30 PERCENT | ISI BEHIND THURSDAY'S MARKET ATTACK | SIEGE AT BOSNIAN PARLIAMENT ENDS | DOGS ...N IN PU(B)LIC AREAS |
|---|---|---|---|
| The populace has shown further unrest over rising inflation in Iran. The economy was at issue in today's... | Informants suggest the ISI planned and carried out Thursday's attack in the Karrada district. While it is... | Witnesses suggest about 1500 legislators and other employees were freed from parliament Friday morning... | ...nian lawmakers may ban dogs from being walked in public. The law may also ban dogs from being driven... |
| *Document* FDE 123/156747-16 | *Document* FDE 123/156747-17 | *Document* FDE 123/156747-18 | *Document* FDE 123/156747-19 |

| MERS CLAIMS ONE MORE VICTIM | MISSILES ORIGINATED IN SYRIA | INDIAN TROOPS FIR... IN KASHMIR | SIDES UNCOMMITTED TO PEACE TALKS |
|---|---|---|---|
| A man in Ra's al Khafji that contracted MERS-CoV a week ago has died. No reports as to the whereabouts of... | Missiles that hit Israeli territory appear to have originated in Syria. Bashar Assad blames rebels for firing the... | The Indian military claims their troops were fired on by Pakistani forces in Kashmir. Pakistan denies any such... | The Syrian rebels appear unwilling to engage in peace talks with Assad's regime. Rebel leaders suggest that... |
| *Document* FDE 123/156747-20 | *Document* FDE 123/156747-21 | *Document* FDE 123/156747-22 | *Document* FDE 123/156747-23 |

| BOSNIA | 96 | 1 | PAKISTAN | 312 | 3 | IRAQ | 155 | 5 |
| SOMALIA | 243 | 2 | IRAN | 291 | 4 | SYRIA | 349 | 6 |

| READER | | | |
|---|---|---|---|
| KIDNAPPING OF CIA BEIRUT STATION CHIEF | SHOOTING OF CANDIDATE LINKED TO TALIBAN | HEZBOLLAH FIGHTERS HELPING SYRIAN TROOPS | DISPUTE OVER JUBALAND CONTINUES |
| CIA Beirut Station Chief John Smith was kidnapped at 7:53pm local time as he was walking home. No group has... | Taliban claimed responsibility for shooting of Pakistan legislative candidate Sadiq Zaman Khattak. The... | Rebels are being pushed further north by Assad's troops with the help of Hezbollah fighters. Hops and... | While the recently created Jubaland state has established a successful electoral process, rival groups are... |
| Document FDE 123/156747-12 | Document FDE 123/156747-13 | | |
| UNREST AS INFLATION REACHES 30 PERCENT | ISI BEHIND THURSDAY MARKET ATTACK | SIEGE AT BOSNIAN PARLIAMENT ENDS | ...O BE BANNED FROM ...AREAS |
| The populace has shown further unrest over rising inflation in Iran. The economy was at issue in today's... | Informants suggest the ISI pl... and carried out Thursday's a... the Karrada district. While it... | Witnesses suggest about 1500 legislators and other employees were freed from parliament Friday morning by police. However, protestors remained outside the parliamentary building as all legislators and staff took early vacations for the week. Local authorities are unsure whether the protests will continue next week. Informants suggest protest leaders will not be turning to violence unless instigated by police. | ...makers may ban dogs from ...ed in public. The law may ...ogs from being driven... |
| Document FDE 123/156747-16 | Document FDE 123/156747-17 | Document FDE 123/156747-18 | |
| MERS CLAIMS ONE MORE VICTIM | MISSILES ORIGINATE[D] SYRIA | | ...NCOMMITTED TO ...TALKS |
| A man in Ra's al Khafji that contracted MERS-Cov a week ago has died. No reports as to the whereabouts of... | Missiles that hit Israel territory appear to have originated in Syria. Bashar Assad blames rebels for firing the... | The Indian military claims their troops were fired on by Pakistani forces in Kashmir. Pakistan denies any such... | The Syrian rebels appear unwilling to engage in peace talks with Assad's regime. Rebel leaders suggest that... |
| Document FDE 123/156747-20 | Document FDE 123/156747-21 | Document FDE 123/156747-22 | Document FDE 123/156747-23 |

| BOSNIA | 96 | 1 | PAKISTAN | 312 | 3 | IRAQ | 155 | 5 |
| SOMALIA | 243 | 2 | IRAN | 291 | 4 | SYRIA | 349 | 6 |

| READER | | | □ X |
|---|---|---|---|
| KIDNAPPING OF CIA BEIRUT STATION CHIEF | SHOOTING OF CANDIDATE LINKED TO TALIBAN | HEZBOLLAH FIGHTERS HELPING SYRIAN TROOPS | DISPUTE OVER JUBALAND CONTINUES |
| CIA Beirut Station Chief John Smith was kidnapped at 7:53pm local time as he was walking home. No group has... | Taliban claimed responsibility for shooting of Pakistan legislative candidate Sadiq Zaman Khattak. The... | Rebels are being pushed further north by Assad's troops with the help of Hezbollah fighters. Homs and... | While the recently created Jubaland state has established a successful electoral process, rival groups are... |
| Document FDE 123/156747-12 | Document FDE 123/156747-13 | Document FDE 123/156747-14 | Document FDE 123/156747-15 |
| UNREST AS INFLATION REACHES 30 PERCENT | ISI BEHIND THURSDAY'S MARKET ATTACK | SIEGE AT BOSNIAN PARLIAMENT ENDS | DOGS TO BE BANNED FROM PUBLIC AREAS |
| The populace has shown further unrest over rising inflation in Iran. The economy was at issue in today's... | Informants suggest the ISI planned and carried out Thursday's attack in the Karrada district. While it is... | Witnesses suggest about 1500 legislators and other employees were freed from parliament Friday morning... BOSNIA | Iranian lawmakers may ban dogs from being walked in public. The law may also ban dogs from being driven... |
| Document FDE 123/156747-16 | Document FDE 123/156747-17 | Document FDE 123/156747-18 | Document FDE 123/156747-19 |
| MERS CLAIMS ONE MORE VICTIM | MISSILES ORIGINATED IN SYRIA | INDIAN TROOPS FIRED ON IN KASHMIR | SIDES UNCOMMITTED TO PEACE TALKS |
| A man in Ra's al Khafji that contracted MERS-Cov a week ago has died. No reports as to the whereabouts of... | Missiles that hit Israeli territory appear to have originated in Syria. Bashar Assad blames rebels for firing the... | The Indian military claims their troops were fired on by Pakistani forces in Kashmir. Pakistan denies any such... | The Syrian rebels appear unwilling to engage in peace talks with Assad's regime. Rebel leaders suggest that... |
| Document FDE 123/156747-20 | Document FDE 123/156747-21 | Document FDE 123/156747-22 | Document FDE 123/156747-23 |
| BOSNIA 97 1 | PAKISTAN 312 3 | IRAQ 155 5 | |
| SOMALIA 243 2 | IRAN 291 4 | SYRIA 349 6 | |

FIG. 11B

READER

Kidnapping of CIA Beirut Station Chief

Shooting of Candidate Linked to Taliban

Hezbollah Fighters Helping...

SIEGE AT BOSNIAN PARLIAMENT ENDS

Witnesses suggest about 1500 legislators and other employees were freed from parliament Friday morning by police. However, protestors remained outside the parliamentary building as all legislators and staff took early vacations for the week.

| BOSNIA | 97 | 1 |
|---|---|---|
| Sarajevo | 48 | |
| Prozor | 8 | |
| Terror | 23 | |
| Disaster | 7 | |
| Zones | 0 | |
| Cells | 3 | |
| Graz Accords | 8 | |

| PAKISTAN | 312 | 3 |
|---|---|---|
| Islamabad | 79 | |
| ISI | 39 | |
| Terror | 54 | |
| Disaster | 38 | |
| Zones | 70 | |
| Cells | 33 | |

| IRAQ | 155 | 5 |
|---|---|---|
| Baghdad | 56 | |
| Basra | 16 | |
| Terror | 31 | |
| Disaster | 15 | |
| Zones | 8 | |
| Cells | 13 | |
| Sectarian Violence | 16 | |

| SOMALIA | 243 | 2 |
|---|---|---|
| Mogadishu | 69 | |
| Oil Fields | 29 | |
| Leadership | 44 | |
| Royal Houses | 28 | |
| Terror | 21 | |
| Disaster | 23 | |
| Death Rate | 14 | |
| Zones | 12 | |
| Cells | 3 | |

| IRAN | 291 | 4 |
|---|---|---|
| Tehran | 87 | |
| Nuclear | 47 | |
| Sanctions | 62 | |
| Disaster | 46 | |
| Zones | 49 | |

| SYRIA | 349 | 6 |
|---|---|---|
| Damascus | 101 | |
| Assad | 37 | |
| Rebels | 193 | |
| Disaster | 1 | |
| Zones | 7 | |
| Cells | 0 | |
| Homs | 5 | |
| Hezbollah | 5 | |

| HEROIN | 15 | 7 |
|---|---|---|
| Afghanistan | 13 | |
| Pakistan | 2 | |

FIG. 12

CABLE READER LABELING

CROSS-REFERENCE TO RELATED APPLICATIONS

This application is a continuation of U.S. patent application Ser. No. 15/425,854, filed on Feb. 6, 2017 and entitled "CABLE READER LABELING," which is a continuation of U.S. patent application Ser. No. 14/332,312, filed on Jul. 15, 2014 and entitled "CABLE READER LABELING," which claims a priority benefit under 35 U.S.C. § 119 to U.S. Provisional Patent Application No. 61/863,792, filed on Aug. 8, 2013, and entitled "CABLE READER LABELING," each of which are hereby incorporated by reference herein in their entireties.

TECHNICAL FIELD

The present disclosure relates to systems and techniques for data integration, analysis, and visualization.

BACKGROUND

Commercial entities, law firms, government entities, and others, gather and process an enormous amount of information. Some of the information gathered and processed is in the form of electronic messages or other such communications. These communications are generated by employees, contractors, or clients and are sent to reviewers (e.g., analysts, other employees, other contractors, other clients, etc.) for review. Often, reviewers review communications related to a common topic or region.

However, because of the enormous amount of information gathered and processed, it can be difficult for reviewers to identify communications that are related to the topic or region that the reviewers are analyzing. While some communications may include benign information (e.g., hours that government offices are expected to be open), other communications may include information that is vital for successfully pursuing business opportunities, proving innocence or guilt, or the like. Thus, communications that are misidentified or that are unidentified can have serious repercussions.

SUMMARY

The systems, methods, and devices described herein each have several aspects, no single one of which is solely responsible for its desirable attributes. Without limiting the scope of this disclosure, several non-limiting features will now be discussed briefly.

A message reader system is disclosed herein that allows reviewers to properly and timely label communications and easily view such communications. The message reader system may organize one or more communications in a tile layout so that reviewers can properly and timely label communications.

In one embodiment, a reviewer can hover over any of the communications to view more details regarding the communication and/or label the communication. For example, the reviewer can move a cursor, such as a mouse pointer or a finger, over a displayed communication. The size of the displayed communication may expand while the cursor is placed over the displayed communication so that the reviewer can view a larger portion (or the entire) content of the displayed communication. As another example, while the cursor is placed over the displayed communication, the reviewer can provide a command, such as selection of a keyboard button, a gesture, a voice command, a mouse input, another keyboard input, and/or the like. Once the command is provided, the displayed communication is labeled with a label associated with the command. Thus, the message reader system advantageously enables communications to be easily viewable and labeled quickly via the movement of a cursor and the selection of a command.

One aspect of the disclosure provides a computing system configured to display a large amount of dynamically updating data. In this embodiment, the computing system comprises a network interface that is coupled to a data network for receiving and transmitting one or more packet flows. The computing system further comprises a computer processor. The computing system further comprises a computer readable storage medium storing program instructions configured for execution by the computer processor in order to cause the computing system to: access a plurality of confidential messages; display the plurality of confidential messages in a tile layout in a first view, wherein each confidential message is displayed in a separate tile; receive a first selection of a first tile in the tile layout in response to a user placing a cursor over the first tile, where the first tile displays a first confidential message; receive a second selection of a label in response to the user selecting a key command while the cursor is placed over the first tile; update a message association data structure to indicate a link between the label and the first confidential message in response to receiving the second selection; and update display of the first tile to include the first confidential message and an indication of the selected label.

The computing system of the preceding paragraph can have any sub-combination of the following features: where the one or more stored program instructions further cause the processor to: receive a third selection of a second label in response to the user selecting a second key command while the cursor is placed over the first tile, update the message association data structure to indicate a link between the second label and the first confidential message in response to receiving the third selection, and update display of the first tile to include the first confidential message and an indication of the second label; where the label is associated with a category, and wherein the second label is associated with a sub-category of the category; where the one or more stored program instructions further cause the processor to: display in the first view a count of a number of confidential messages associated with the label, and updating the count in response to the update of the message association data structure; where the one or more stored program instructions further cause the processor to display an expanded view of the first tile in the first view in response to the user selecting the first tile; where the one or more stored program instructions further cause the processor to: display one or more labels in a second view, receive a third selection of a second label in the one or more labels in the second view, and display one or more confidential messages associated with the second label in the tile layout; and where the cursor comprises at least one of a mouse pointer or a finger of the user.

Another aspect of the disclosure provides a computer-implemented method of displaying a large amount of dynamically updating data. In this embodiment, the computer-implemented method comprises, as implemented by one or more computer systems comprising computer hardware and memory, the one or more computer systems configured with specific executable instructions, accessing a plurality of messages; displaying the plurality of messages in a tile layout in a first view, wherein each message is displayed in a separate tile; receiving a first selection of a first tile in the tile layout in response to a user placing a cursor over the first tile, wherein the first tile displays a first message; receiving a second selection of a label in response to the user selecting a key command while the cursor is placed over the first tile; updating a message association data structure to indicate a link between the label and the first message in response to receiving the second selection; and updating display of the first tile to include the first message and an indication of the selected label.

The computer-implemented method of the preceding paragraph can have any sub-combination of the following features: where the computer-implemented method further comprises receiving a third selection of a second label in response to the user selecting a second key command while the cursor is placed over the first tile, updating the message association data structure to indicate a link between the second label and the first message in response to receiving the third selection, and updating display of the first tile to include the first message and an indication of the second label; where the label is associated with a category, and wherein the second label is associated with a sub-category of the category; where the computer-implemented method further comprises displaying in the first view a count of a number of messages associated with the label, and updating the count in response to the update of the message association data structure; where the computer-implemented method further comprises displaying an expanded view of the first tile in the first view in response to the user selecting the first tile; and where the computer-implemented method further comprises displaying one or more labels in a second view, receiving a third selection of a second label in the one or more labels in the second view, and displaying one or more messages associated with the second label in the tile layout.

Another aspect of the disclosure provides a non-transitory computer-readable medium comprising one or more program instructions recorded thereon, the instructions configured for execution by a computing system comprising one or more processors in order to cause the computing system to: access a plurality of messages; display the plurality of messages in a tile layout in a first view, wherein each message is displayed in a separate tile; receive a first selection of a first tile in the tile layout in response to a user placing a cursor over the first tile, wherein the first tile displays a first message; receive a second selection of a label in response to the user providing a command while the cursor is placed over the first tile; update a message association data structure to indicate a link between the label and the first message in response to receiving the second selection; and update display of the first tile to include the first message and an indication of the selected label.

The non-transitory computer-readable medium of the preceding paragraph can have any sub-combination of the following features: where the instructions are further configured to cause the computing system to: receive a third selection of a second label in response to the user selecting a second command while the cursor is placed over the first tile, update the message association data structure to indicate a link between the second label and the first message in response to receiving the third selection, and update display of the first tile to include the first message and an indication of the second label; where the label is associated with a category, and wherein the second label is associated with a sub-category of the category; where the instructions are further configured to cause the computing system to: display in the first view a count of a number of messages associated with the label, and update the count in response to the update of the message association data structure; where the instructions are further configured to cause the computing system to display an expanded view of the first tile in the first view in response to the user selecting the first tile; where the instructions are further configured to cause the computing system to: display one or more labels in a second view, receive a third selection of a second label in the one or more labels in the second view, and display one or more messages associated with the second label in the tile layout; and where the command comprises at least one a gesture, a voice command, a mouse input, or a keyboard input.

BRIEF DESCRIPTION OF THE DRAWINGS

FIG. 2 illustrates an example user interface of the message reader system including confidential messages displayed in a tile layout.

FIG. 3 illustrates an example user interface of the message reader system in which a confidential message is selected by hovering with a cursor.

FIGS. 4A-B illustrate example user interfaces of the message reader system in which a label is selected for a confidential message using a key command.

FIG. 5 illustrates an example user interface of the message reader system in which a confidential message is selected by hovering or gesturing with a finger.

FIGS. 6A-B illustrate other example user interfaces of the message reader system in which a label is selected for a confidential message using a key command.

FIG. 7 illustrates another example user interface of the message reader system in which a confidential message is selected by hovering with a cursor.

FIGS. 11A-B illustrate example user interfaces of the message reader system in which a confidential message includes a label.

FIG. 12 illustrates an example user interface of the message reader system in which a set of labels and sub-labels are displayed.

DETAILED DESCRIPTION OF SPECIFIC EMBODIMENTS

Overview

Disclosed herein are various systems and methods that allow reviewers to properly and timely label communications and easily view such communications. Certain systems and methods described herein organize one or more communications in a tile layout so that reviewers can properly and timely label communications. A reviewer can hover over any of the communications to view more details regarding the communication and/or label the communication. For example, the reviewer can move a cursor, such as a mouse pointer or a finger, over a displayed communication. In some embodiments, the size of the displayed communication expands while the cursor is placed over the displayed communication so that the reviewer can view a larger portion (or the entire) content of the displayed communication. In addition, while the cursor is placed over the displayed communication, the reviewer can provide a command (e.g., selection of a keyboard button, a gesture, a voice command, a mouse input, another keyboard input, etc.). Once the command is provided, the displayed communication is labeled with a label associated with the command. In this way, communications are easily viewable and can be labeled quickly via the movement of a cursor and the selection of a command.

Message Network System Overview

Figure 1:
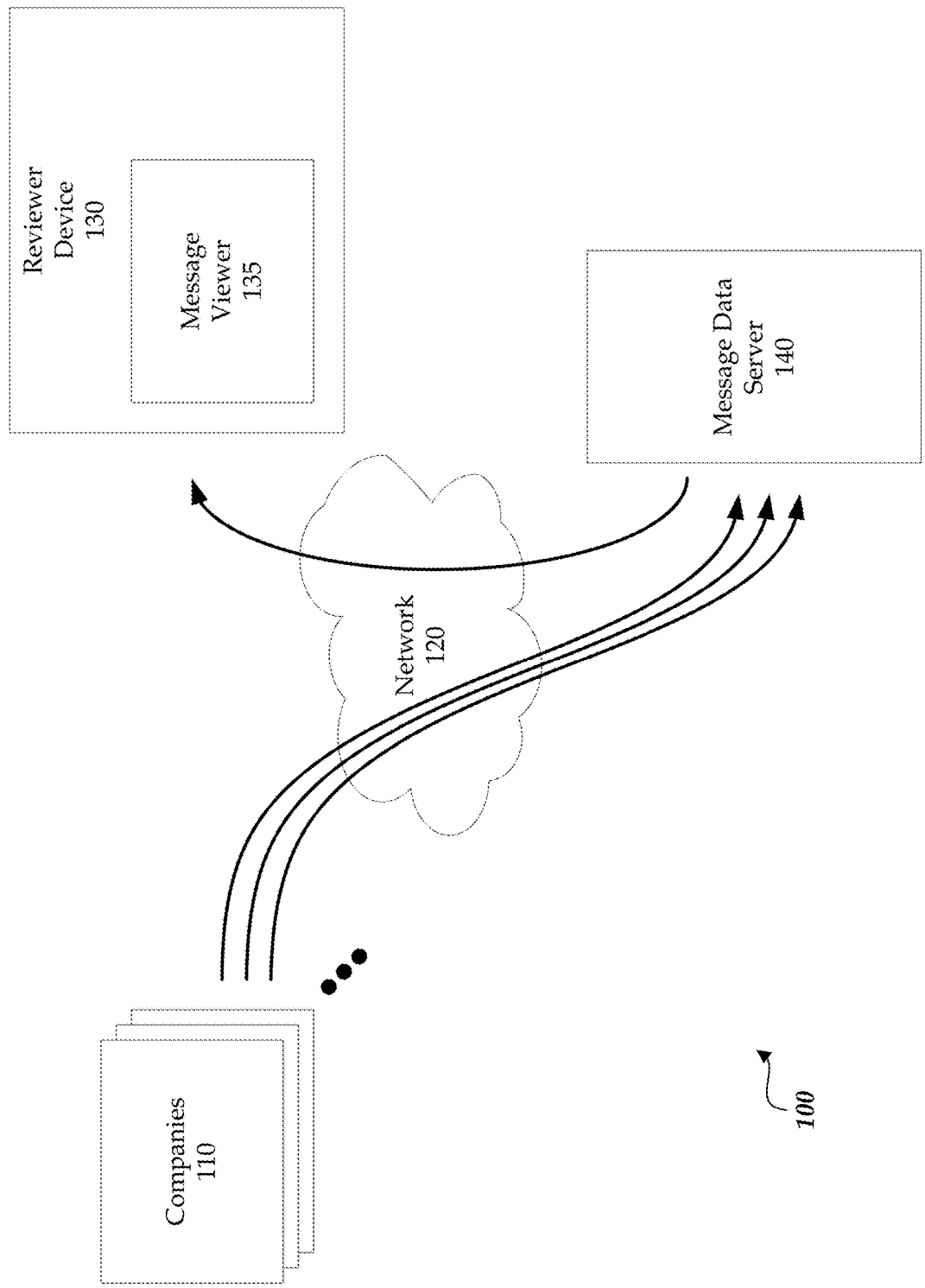
FIG. 1 illustrates a block diagram of a message reader system for labeling confidential messages according to one embodiment.

FIG. 1 illustrates a block diagram of a message reader system 100 for labeling confidential messages. The message reader system 100 comprises one or more companies 110, a reviewer device 130, a message data sever 140, and a network 120.

In the embodiment illustrated in FIG. 1, the one or more companies 110, which may be implemented by one or more first physical computing devices, are communicatively connected to message data server 140, which may be implemented by one or more second physical computing devices, over the network 120. Similarly, the reviewer device 130 may be implemented by one or more third physical computing devices and may be communicatively connected to the message data server 140 over the network 120. In some embodiments, each such physical computing device may be implemented as a computer system including some or all of the components illustrated in the example computing system 1400 of FIG. 14. For example, the one or more companies 110 and/or the reviewer device 130 may be implemented in a computer system as a set of program instructions recorded on a machine-readable storage medium.

The one or more companies 110 represent devices operated by employees, contractors, or other personnel associated with a commercial entity, a law firm, a government entity, and/or the like. The employees, contractors, or other personnel associated with a commercial entity, a law firm, a government entity, and/or the like may draft messages (e.g., electronic messages, confidential government cables, etc.) to communicate a field update, gathered information, a news report, and/or the like. These messages may be transmitted to the message data server 140 for storage.

The reviewer device 130 represents a device operated by a reviewer that reviews and/or analyzes messages received from the message data server 140. Depending on the embodiment, the reviewer may be a salesperson, administrator, executive, analyst, or other representative of a commercial or governmental entity. The reviewer device 130 comprises a message viewer 135. The message viewer 135 allows the reviewer to view and/or manipulate one or more messages via a graphical user interface (GUI). For example, the message viewer 135 may include GUI logic. The GUI logic may be a set of program instructions configured for execution by one or more computer processors of the reviewer device 130, which are operable to receive user input and to display a graphical representation of the messages using the approaches described herein. The GUI logic may be operable to receive user input from, and display a graphical representation of the messages to, a GUI that is provided on a display (not shown) by the computer system on which the reviewer device 130 executes.

In some embodiments, the GUI logic is omitted. For example, in one embodiment, the reviewer device 130 (and specifically the message viewer 135) may comprise an application program or process that issues one or more function calls or application programming interface (API) calls to the message data server 140 to obtain information resulting from, to provide input to, and to execute along with the message data server 140, the processes or one or more steps thereof as described herein. For example, the reviewer device 130 may request messages using a programmatic interface, and then the reviewer, using the reviewer device 130, may use, process, log, store, label, and/or otherwise interact with the messages according to local logic. The reviewer device 130 may also interact with the message data server 140 to provide input, labeling instructions, and/or other data as described herein using a programmatic interface, and then the message data server 140 may use, process, log, store, label, and/or otherwise interact with the messages according to the message data server 140 logic.

The message data server 140 may be implemented as a special-purpose computer system having logical elements. In an embodiment, the logical elements may comprise program instructions recorded on one or more machine-readable storage media. Alternatively, the logical elements may be implemented in hardware, firmware, or a combination thereof.

When executed by one or more processors of the computer system, logic in the message data server 140 is operable to analyze and/or label the messages according to the techniques described herein. In one embodiment, the message data server 140 may be implemented in a Java Virtual Machine (JVM) that is executing in a distributed or non-distributed computer system. In other embodiments, the message data server 140 may be implemented as a combination of programming instructions written in any programming language (e.g. C++ or Visual Basic) and hardware components (e.g., memory, CPU time) that have been allocated for executing the program instructions.

In an embodiment, the network 120 includes any communications network, such as the Internet. The network 120 may be a wired network, a wireless network, or a combination of the two. For example, network 120 may be a local area network (LAN) and/or a wireless area network (WAN).

Message Reader Labeling

FIG. 2 illustrates a user interface 200 of the message reader system 100 including confidential messages 210a-l displayed in a tile layout 205. As an example, the confidential messages 210a-l may be confidential government cables. The user interface 200 may be displayed by the message viewer 135 as described above.

The confidential messages 210a-l may be received from the message data server 140. In some embodiments, a portion of the content of each confidential message 210a-l (e.g., a title, an excerpt of the body of the message, a document or message identification code, etc.) is displayed in the tile layout 205. To view the entire content of a confidential message 210a-l, the reviewer can click a mouse button while hovering over the confidential message 210a-l or tap with a finger while hovering over the confidential message 210a-l. While the confidential messages 210a-l are illustrated in FIG. 2 as being displayed in a rectangular format and in a tile layout, this is not meant to be limiting. The confidential messages 210a-l (or a portion thereof) may be displayed in any shape and in any format in the user interface 200. For example, the confidential messages 210a-I may be displayed in list form (e.g., each confidential message occupies at least one horizontal line in the user interface 200) rather than in a tile layout.

In an embodiment, the user interface 200 further displays one or more labels in a label window 212. The labels represent categories and/or sub-categories that can be applied to a confidential message. The labels may be associated with a count (e.g., a number of confidential messages that fall within the category represented by the label) and an identification number or code. For example, the labels in the label window 212 include "Bosnia" (with a count of 96 and an identification number of "1"), "Somalia" (with a count of 243 and an identification number of "2"), "Pakistan" (with a count of 312 and an identification number of "3"), "Iran" (with a count of 291 and an identification number of "4"), "Iraq" (with a count of 155 and an identification number of "5"), and "Syria" (with a count of 349 and an identification number of "6").

As described and illustrated below, once a confidential message is labeled, the label and/or the identification number or code of the label is displayed with the confidential message. To view one or more confidential messages that are associated with a particular label, the reviewer can click on the title, count, and/or identification number of code of the label in the label window 212.

FIG. 3 illustrates the user interface 200 of the message reader system 100 in which the confidential message 210h is selected by hovering with a cursor 320. As illustrated in FIG. 3, the cursor 320 is a mouse pointer, but may be any other indicia in other embodiments.

In an embodiment, when a reviewer moves the cursor 320 over a confidential message 210a-I (e.g., when the cursor 320 hovers over a confidential message 210a-I), the confidential message 210a-I is highlighted and/or otherwise changes appearances to provide feedback that the confidential message 210a-I is selected. In the example of FIG. 3, the cursor 320 is located over the confidential message 210h. The border of the confidential message 210h is bolded to provide feedback that the confidential message 210h is selected.

Once a confidential message 210a-I is selected (e.g., by hovering over the confidential message 210a-I), the reviewer can perform an operation. For example, the reviewer can label the confidential message 210a-I with one or more of the labels listed in the label window 212.

FIGS. 4A-B illustrate user interfaces 200 of the message reader system 100 in which a label is selected for the confidential message 210h using a key command. For example, a label may be applied to the confidential message 210h when a key command associated with the particular label is selected while the cursor 320 is hovering over the confidential message 210h.

As illustrated in FIG. 4A, the label "Bosnia" may be applied to the confidential message 210h when a keyboard button associated with the subject or title (e.g., "Bosnia") of the label, such as "b" key 430a of a keyboard of the reviewer device, is pressed while the cursor 320 is hovering over the confidential message 210h. As illustrated in FIG. 4B, the label "Bosnia" may be applied to the confidential message 210h when a keyboard button associated with the identification number or code (e.g., "1") of the label, such as "1" key 430b of the keyboard of the reviewer device, is pressed while the cursor 320 is hovering over the confidential message 210h. The keyboard can be a physical keyboard or a virtual keyboard that appears in a display, such as a touchscreen display.

In other embodiments, not shown, additional labels can be applied to a confidential message 210a-I when a second key command associated with the particular label is selected while the cursor 320 is hovering over the confidential message 210a-I. For example, a first key command, such as the selection of key 430a, applies a first label to a confidential message 210a-I. After the first label is applied, the reviewer can provide a second key command to apply a second label to the confidential message 210a-I. The second label may be a sub-label of the first label (e.g., a sub-category of the category represented by the first label) or a label of a different family than the first label. In this manner, the reviewer can select one or more of many labels for assignment to a particular message and assign those labels with minimal interactions, such as a mouse over (e.g., without clicking on the messages) and pressing of a keyboard key.

While FIGS. 4A-B illustrate the selection of a key command to label a confidential message 210a-I, the use of a key command is not meant to be limiting. A confidential message 210a-I can be labeled when any command is provided while the cursor 320 is hovering over the confidential message 210a-I. For example, a gesture, a voice command, a mouse input, and/or another keyboard input can be used to label the confidential message 210h while the cursor 320 is hovering over the confidential message 210h.

In some embodiments, the cursor used to hover over a confidential message is a mouse pointer. However, in other embodiments, the cursor used to hover over a confidential message can be a finger of a user or reviewer.

FIG. 5 illustrates the user interface 200 of the message reader system 100 in which the confidential message 210h is selected by hovering or gesturing with a finger 520. For example, the message viewer 135 can display the GUI on a touchscreen. The user or reviewer can touch, touch and hold, or touch and release a displayed confidential message to select the confidential message. As another example, the user or reviewer can place a finger a certain distance above a displayed confidential message to select the confidential message. As another example, the user or reviewer can perform a gesture (e.g., a swipe of the finger over a confidential message) to select the confidential message.

Figure 6B:
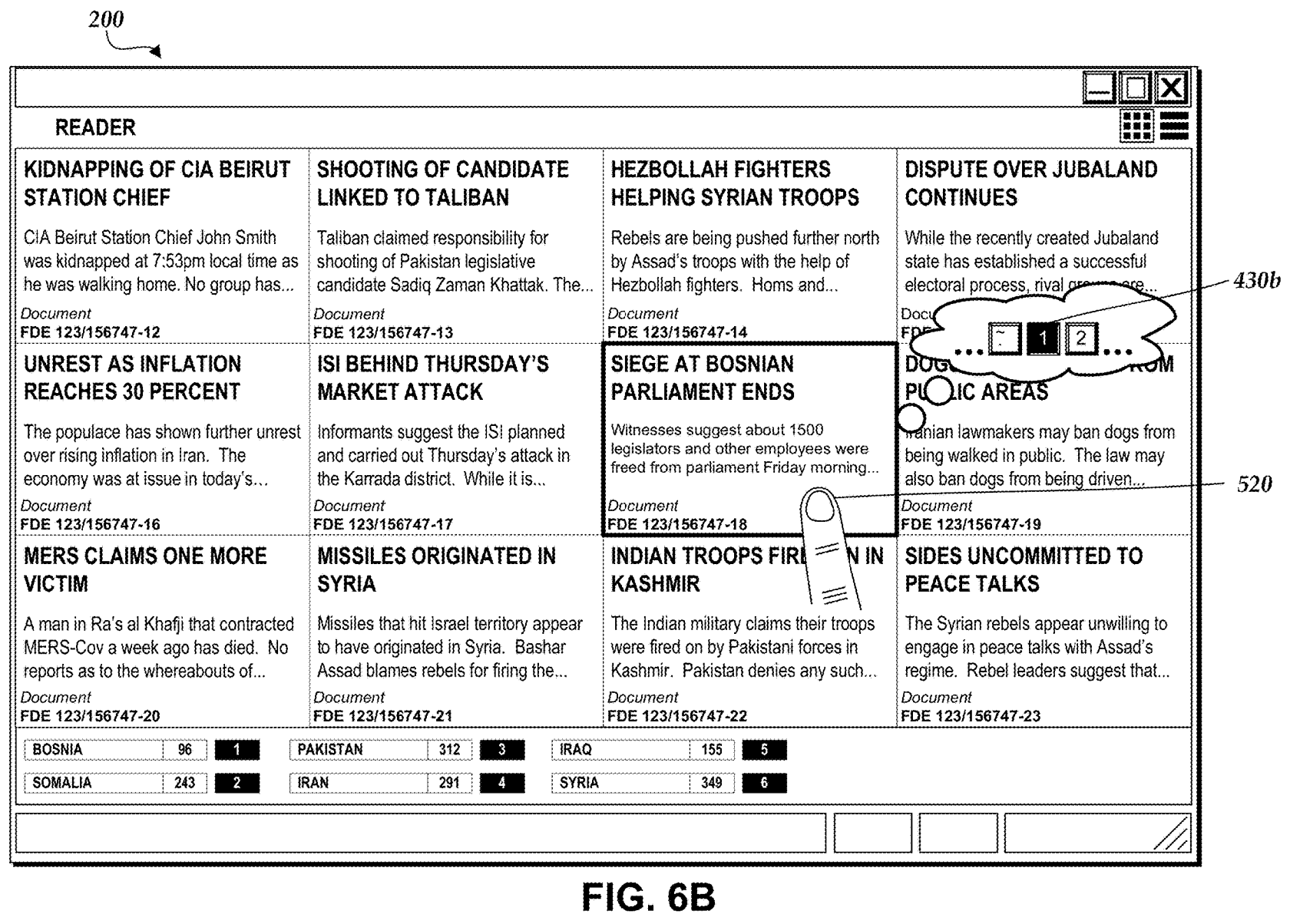

FIGS. 6A-B illustrate other user interfaces 200 of the message reader system 100 in which a label is selected for the confidential message 210h using a key command. As described above with respect to FIGS. 4A-B, a label may be applied to the confidential message 210h when a key command associated with the particular label is selected while the cursor 320 is hovering over the confidential message 210h. Likewise, one or more labels may be applied to the confidential message 210h when one or more key commands (or any other commands described above) associated with the particular label are selected while the finger 520 has selected (e.g., touches or hovers over) the confidential message 210h in any of the ways described above.

As described above, a confidential message can change its appearance to provide feedback to the reviewer that the confidential message is selected. FIG. 7 illustrates another user interface 700 of the message reader system 100 in which the confidential message 210h is selected by hovering with the cursor 320. Any discussion herein of the cursor 320 can be a mouse pointer, the finger 520 of a reviewer, a stylus, and/or any other object capable of providing input. The cursor 320 can be used to select a confidential message in any manner as described above with respect to the mouse pointer 320 or the finger 520. Unlike the confidential message 210h as illustrated in FIG. 3, the confidential message 210*h* as illustrated in FIG. 7 includes a bolded border and a larger size to provide feedback that the confidential message 210*h* is selected.

A confidential message that is selected, such as the confidential message 210*h*, may overlap and hide portions of nearby confidential messages in the tile layout 205. In some embodiments, the larger size of the confidential message 210*h* allows the reviewer to view a larger portion of the content of the confidential message 210*h*. In this way, the reviewer can view more information to aid in determining how to label the confidential message without having to perform the extra step of clicking on the confidential message (e.g., the reviewer merely has to hover over the confidential message to view more information).

Figure 8A:
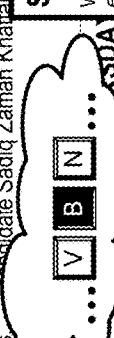
FIGS. 8A-B illustrate other example user interfaces of the message reader system in which a confidential message is labeled using a key command.
Figure 8B:
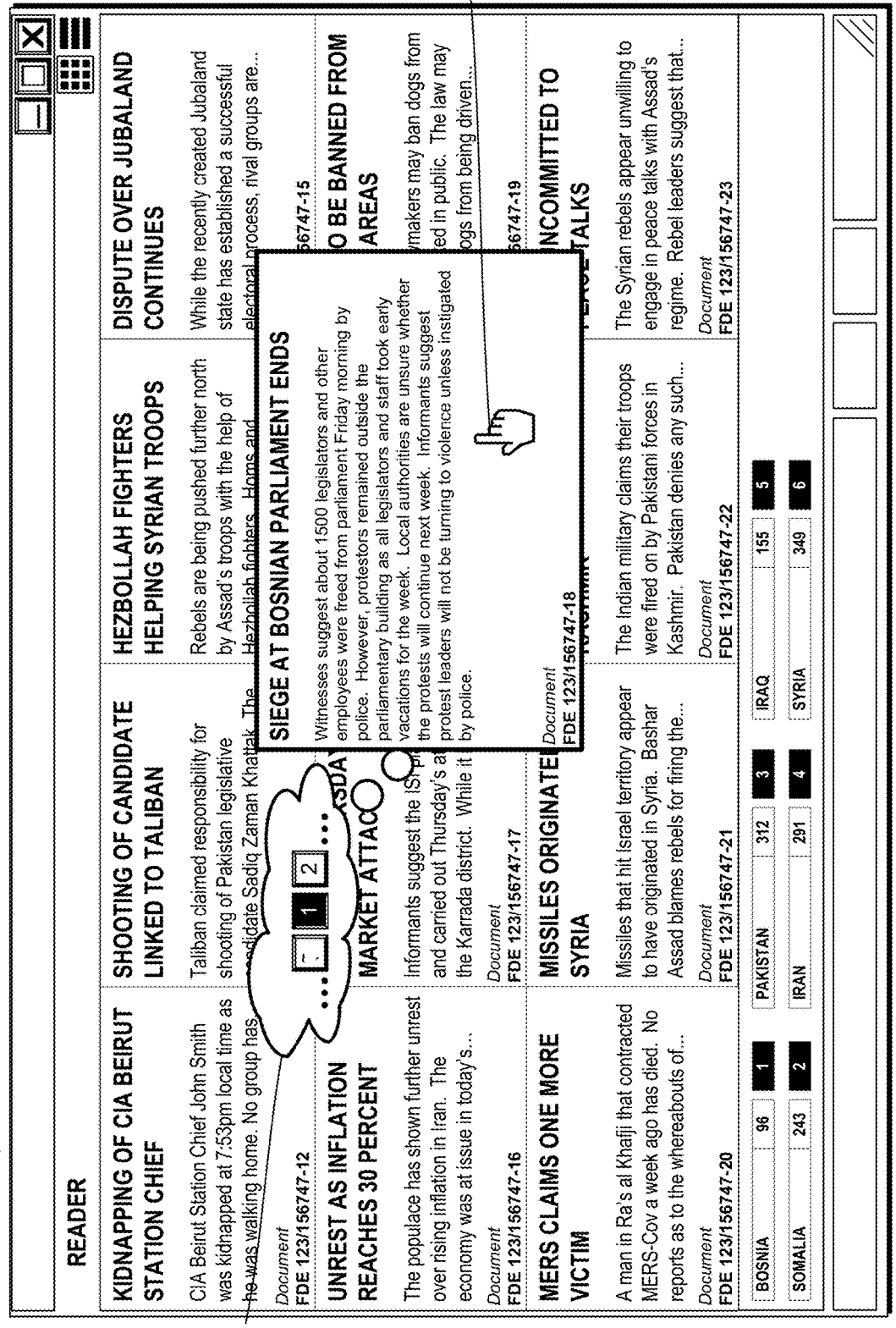

FIGS. 8A-B illustrate other user interfaces 700 of the message reader system 100 in which the confidential message 210*h* is labeled using a key command. As described above with respect to FIGS. 4A-B and FIGS. 6A-B, one or more labels may be applied to the confidential message 210*h* when one or more key commands (or any other commands described above) associated with the particular label are selected while the confidential message 210*h* is selected in any manner described above.

Figure 9:
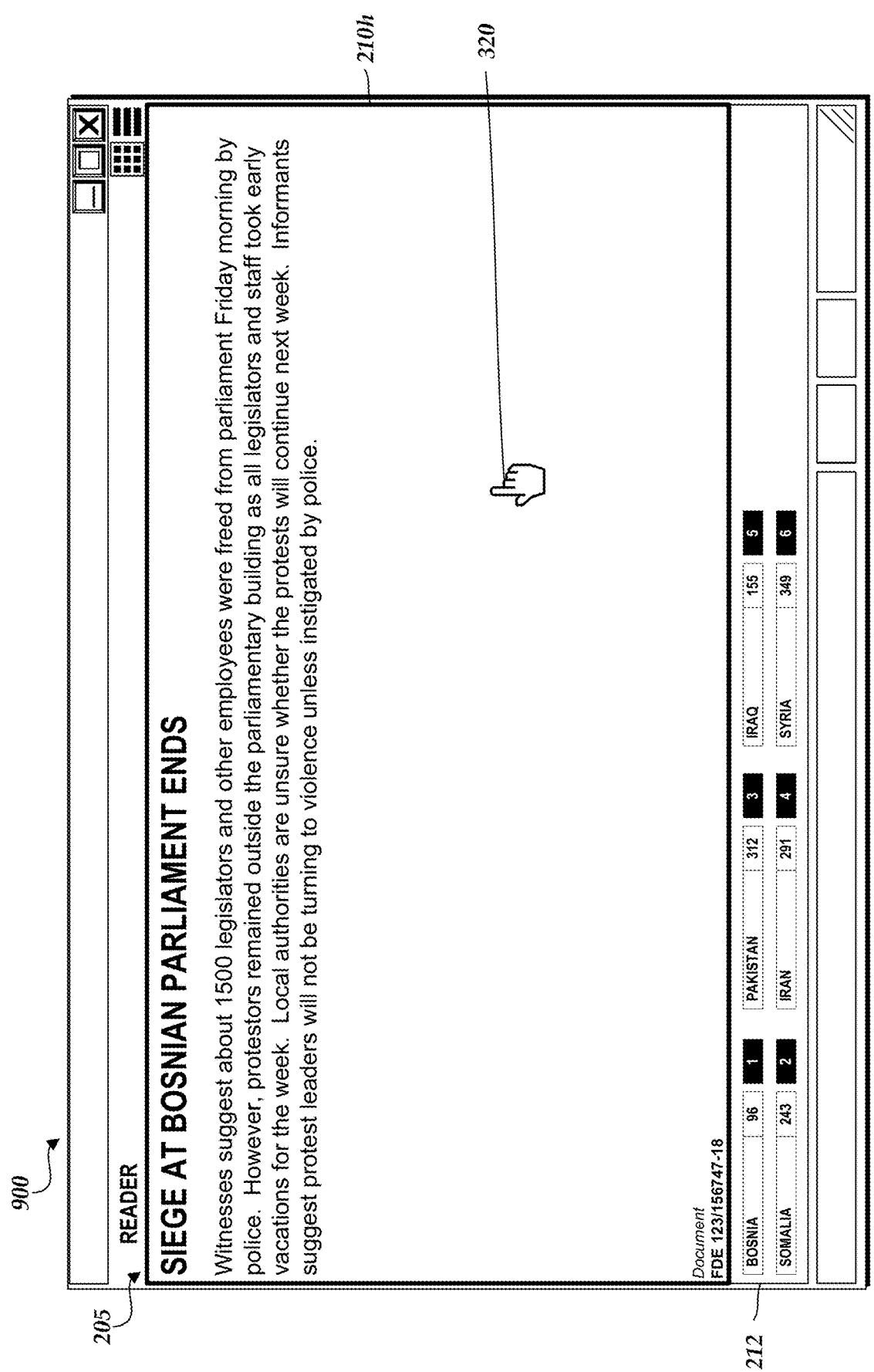
FIG. 9 illustrates another example user interface of the message reader system in which a confidential message is selected by hovering with a cursor.

FIG. 9 illustrates another user interface 900 of the message reader system 100 in which the confidential message 210*h* is selected by hovering with the cursor 320. Unlike the confidential message 210*h* as illustrated in FIGS. 3 and 7, the confidential message 210*h* as illustrated in FIG. 9 includes a bolded border and a size that fills the tile layout 205 portion of the user interface 900 to provide feedback that the confidential message 210*h* is selected.

In some embodiments, the larger size of the confidential message 210*h* allows the reviewer to view a larger portion of the content of the confidential message 210*h*. In this way, the reviewer can view more information to aid in determining how to label the confidential message without having to perform the extra step of clicking on the confidential message (e.g., the reviewer merely has to hover over the confidential message to view more information). In one embodiment, another confidential message may be selected to fill the tile layout 205 portion (in place of the message 210*h* illustrated in FIG. 9) by moving the cursor 320 over the area associated with another message (even though the tiles are covered/not shown in the embodiment of FIG. 9). For example, the cursor 320 may be moved over the area associated with a message adjacent to the currently selected tile of message 210*h*, such as over the area of adjacent tiles 210*f* and 210*g*.

Figure 10A:
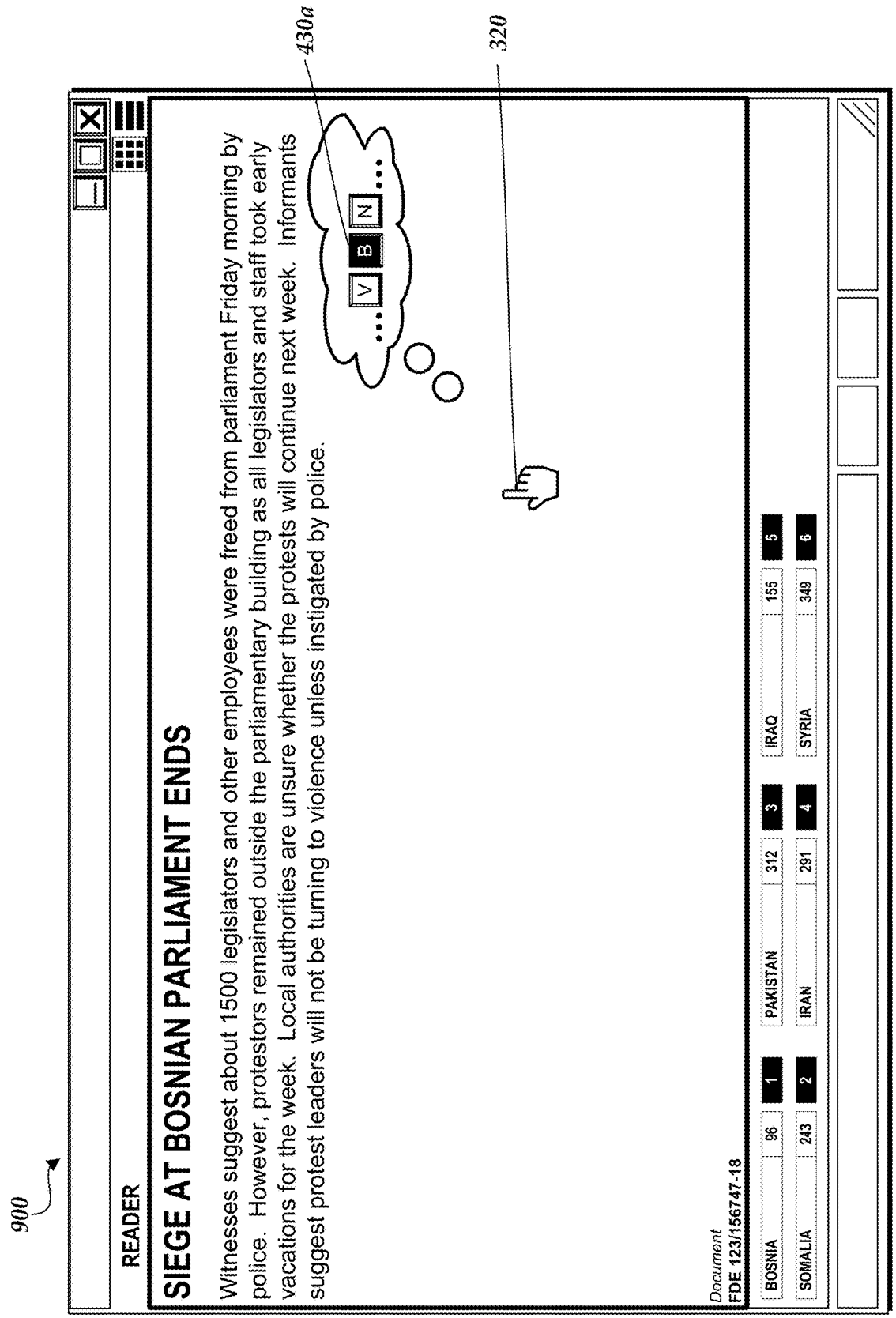
FIGS. 10A-B illustrate other example user interfaces of the message reader system in which a confidential message is labeled using a key command.
Figure 10B:
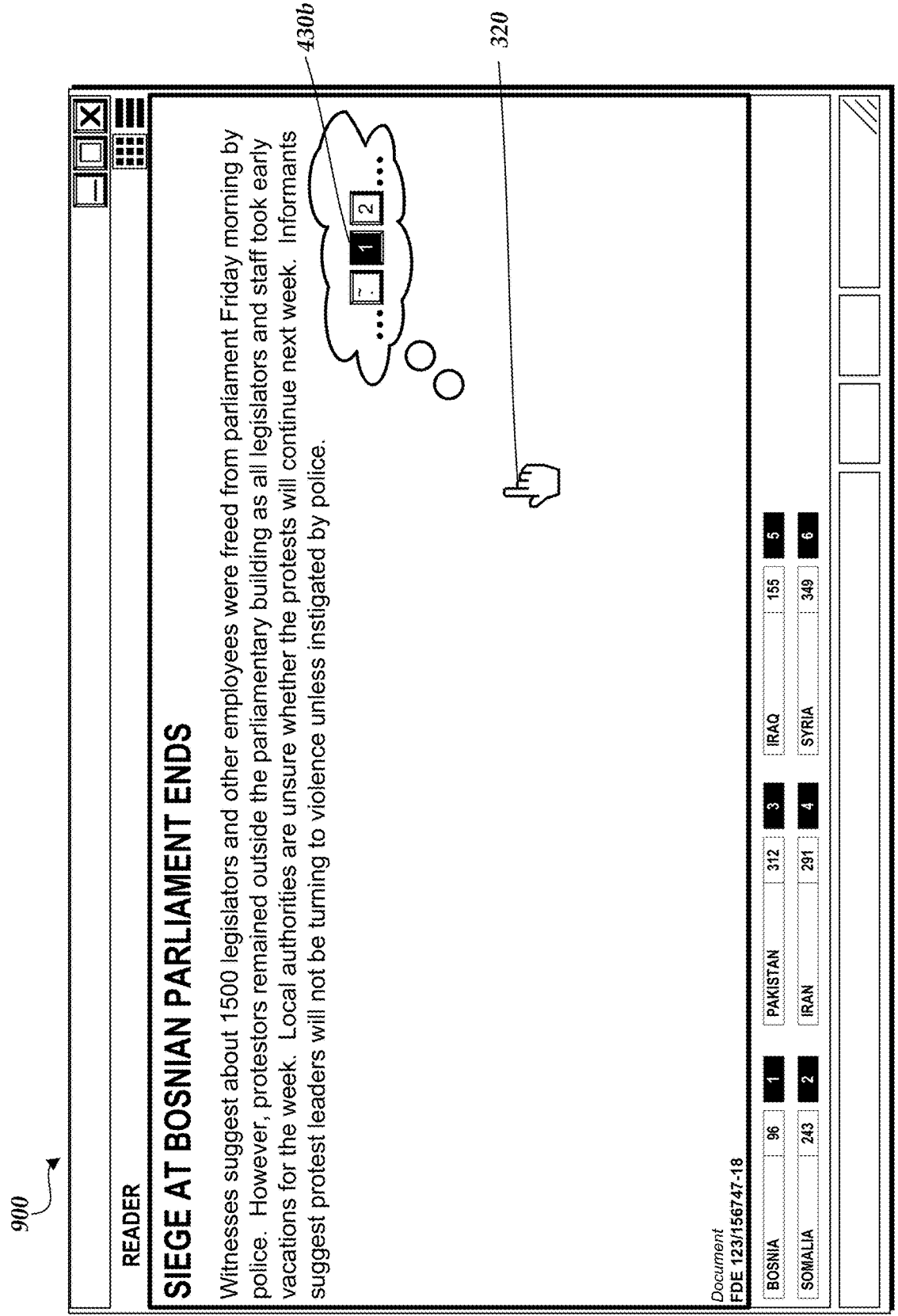

FIGS. 10A-B illustrate other user interfaces 900 of the message reader system 100 in which the confidential message 210*h* is labeled using a key command. As described above with respect to FIGS. 4A-B, 6A-B, and 8A-B, one or more labels may be applied to the confidential message 210*h* when one or more key commands (or any other commands described above) associated with the particular label are selected while the confidential message 210*h* is selected in any manner described above.

Figure 11A:
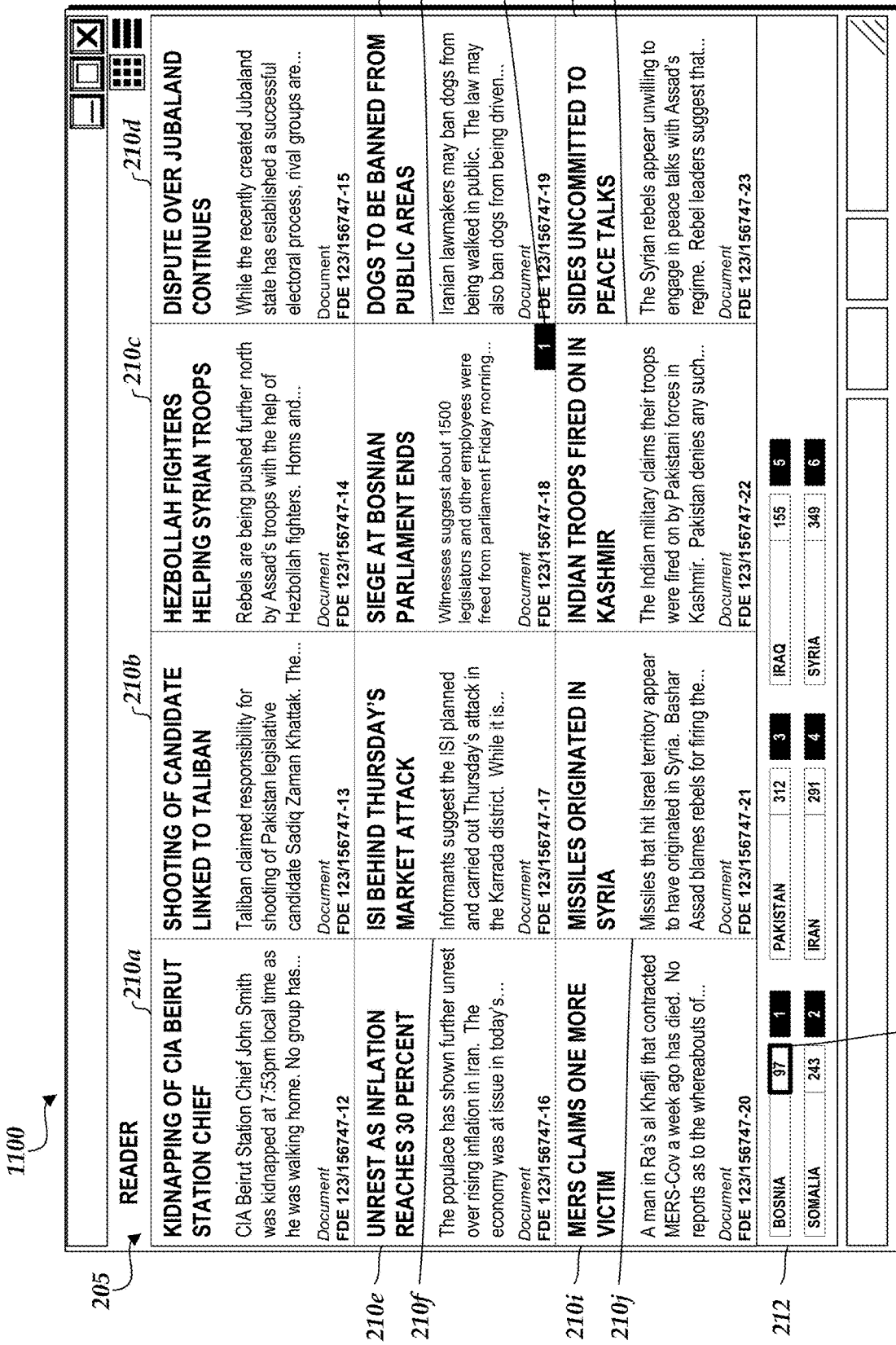

FIGS. 11A-B illustrate user interfaces 1100 of the message reader system 100 in which the confidential message 210*h* includes a label. In some embodiments, the identification number or code associated with a label is displayed in conjunction with a confidential message 210*a*-I. As illustrated in the example of FIG. 11A, the confidential message 210*h* is labeled with label 1102*a*. In an embodiment, label 1102*a* includes the identification number or code of the label applied to the confidential message 210*h*. For example, label 1102*a* includes the number "1," which is the identification number associated with the label "Bosnia."

In other embodiments, the subject or title associated with a label is displayed in conjunction with a confidential message 210*a*-I. As illustrated in FIG. 11B, the confidential message 210*h* is labeled with label 1102*b*. In an embodiment, label 1102*b* includes the subject or title of the label applied to the confidential message 210*h*. For example, label 1102*b* includes the name "Bosnia," which is the subject or title associated with the label "Bosnia."

In still other embodiments, not shown, the label displayed in conjunction with the confidential message 210*a*-I can include any information that can be used to identify which label in the label window 212 is associated with the particular confidential message 210*a*-I.

Once a confidential message, such as the confidential message 210*h*, is labeled, the count associated with the label is incremented by one. For example, count 1110, which is associated with the label "Bosnia," is incremented from 96 to 97 once confidential message 210*h* is labeled. In some embodiments, the count 1110 is highlighted or otherwise changes appearances to provide feedback to the reviewer that the count has increased.

FIG. 12 illustrates a user interface 1200 of the message reader system 100 in which a set of labels and sub-labels are displayed. As described above, at least portions of the confidential messages 210*a*-I can be displayed in a tile layout, a list form, or another layout. As an example, the user interface 1200 includes a list form in pane 1204 where the titles of various confidential messages are listed. The user interface 1200 also includes a pane 1206 in which a selected confidential message can be viewed.

In some embodiments, the label window 212 expands when a reviewer clicks or otherwise selects the label window 212. The expanded label window 212 may overlap at least a portion of the panes 1204 and/or 1206 and/or the tile layout 205 (not shown). Any of the labels or sub-labels can be selected by the reviewer. Selection of a label or sub-label causes the message viewer 135 to retrieve and display confidential messages associated with the selected label or sub-label in the pane 1204, the pane 1206, and/or the tile layout 205 (not shown).

Example Process Flows

Figure 13:
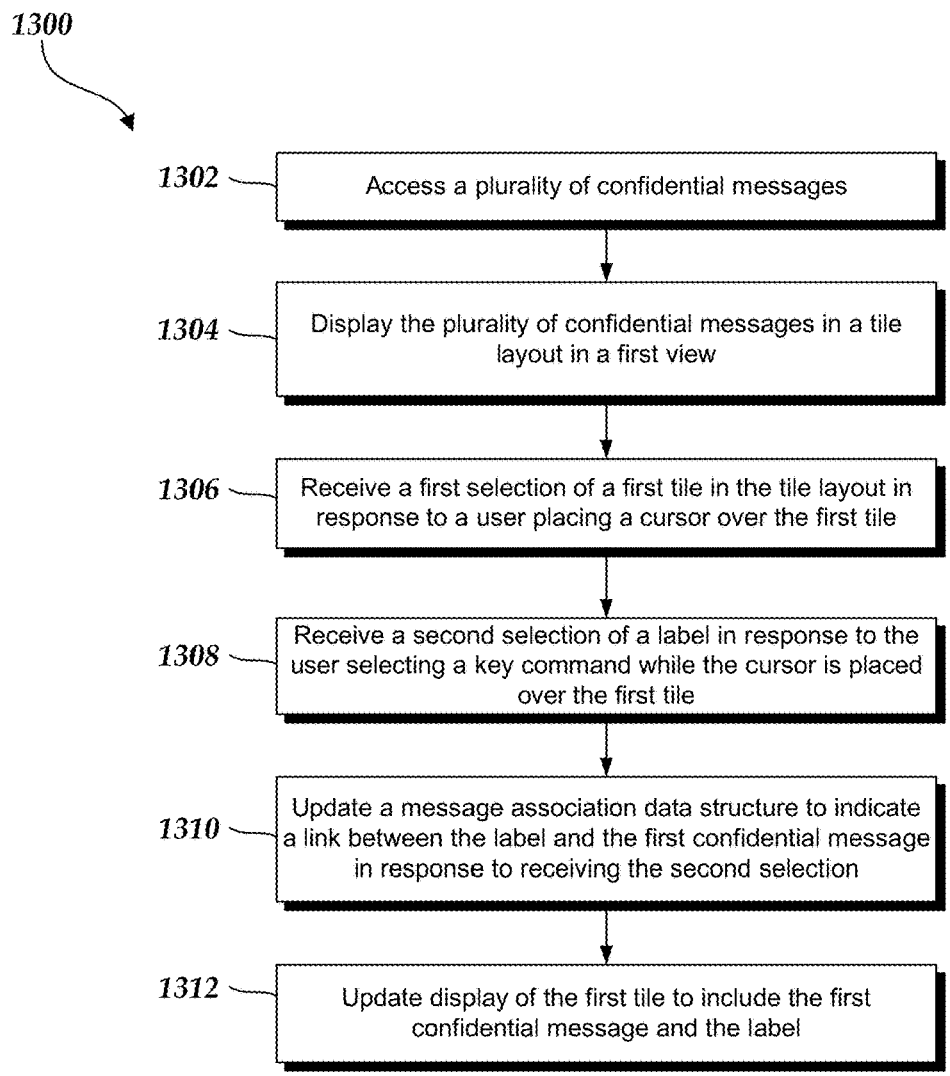
FIG. 13 is a flowchart depicting one embodiment of a method of operation of the message reader system.

FIG. 13 is a flowchart 1300 depicting one embodiment of illustrative operations of the message reader system 100. Depending on the embodiment, the method of FIG. 13 may be performed by various computing device, such as by the reviewer device 130 and/or the message data server 140. For ease of discussion, the method is discussed herein with reference to reviewer device 130 and the message viewer 135 of the reviewer device 130. Depending on the embodiment, the method of FIG. 13 may include fewer and/or additional blocks and the blocks may be performed in an order different than illustrated.

In block 1302, the message reader system 100 accesses a plurality of confidential messages. For example, the confidential messages may be accessed from the message data server 140 and provided to the reviewer device 130.

In block 1304, at least some of the plurality of confidential messages are displayed on the reviewer device 130 in a tile layout in a first view. In an embodiment, each confidential message is displayed in a separate tile. In other embodiments, not shown, the plurality of confidential messages are displayed in a list form in the first view.

In block 1306, the reviewer device 130 receives a first selection of a first tile in the tile layout in response to a user placing a cursor over the first tile. In an embodiment, the cursor is a mouse pointer. In another embodiment, the cursor is a finger of the user. The first tile may display a first confidential message.

In block 1308, the reviewer device 130 receives a second selection of a label in response to the user selecting a key command while the cursor is placed over the first tile. The key command can be selected via the use of a physical or virtual keyboard. In other embodiments, not shown, the reviewer device 130 receives the second selection of the label in response to the user selecting another command, such as a gesture, a voice command, a mouse input, and/or another keyboard input while the cursor is placed over the first tile.

In block 1310, the reviewer device 130 and/or message data server 140 updates a message association data structure to indicate a link between the label and the first confidential message in response to receiving the second selection.

In block 1312, the reviewer device 130 updates display of the first tile to include the first confidential message and the label and/or an updated count associated with the label. The label may include the subject or title of the label or the identification number or code associated with the label.

As described above, a confidential message is a type of message. Any discussion herein of a confidential message can apply to any other type of message, such as a confidential government cable. For example, other messages can be confidential or non-confidential and can include electronic messages (e.g., emails, text messages, instant messages, voicemails, reminders or alerts, etc.), presentations, news articles, reports, letters, and/or any other type of communication that includes content.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 14:
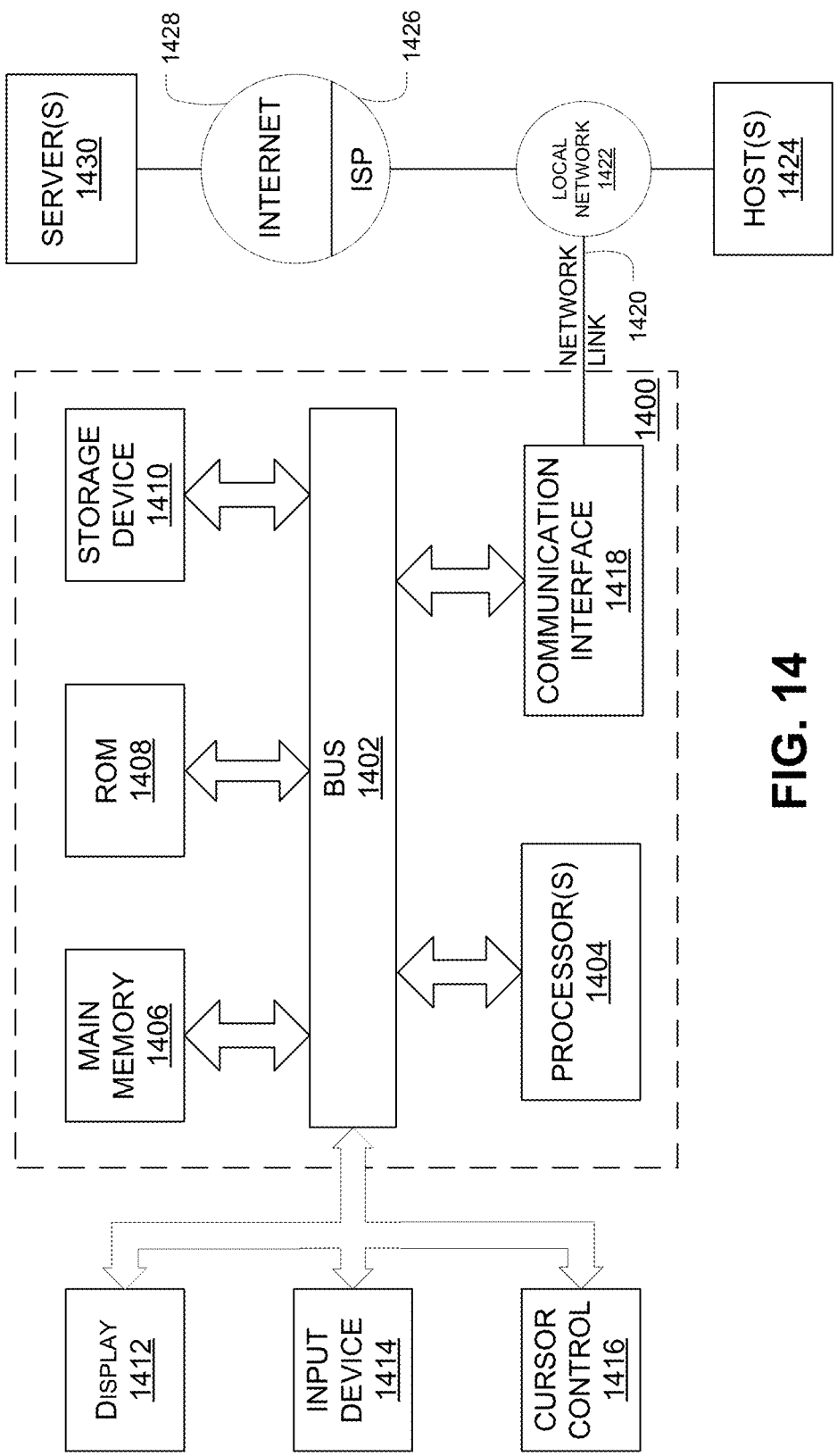
FIG. 14 illustrates one embodiment of a computer system with which certain methods discussed herein may be implemented.

For example, FIG. 14 is a block diagram that illustrates a computer system 1400 upon which an embodiment may be implemented. For example, any of the computing devices discussed herein, such as the reviewer device 130, the message data server 140, and the companies 110 (which may be government entities in some embodiments), may include some or all of the components and/or functionality of the computer system 1400.

Computer system 1400 includes a bus 1402 or other communication mechanism for communicating information, and a hardware processor, or multiple processors, 1404 coupled with bus 1402 for processing information. Hardware processor(s) 1404 may be, for example, one or more general purpose microprocessors.

Computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

Computer system 1400 may be coupled via bus 1402 to a display 1412, such as a cathode ray tube (CRT) or LCD display (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 804 and for controlling cursor movement on display 1412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may retrieve and execute the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN (or WAN component to communicated with a WAN). Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

Object Centric Data Model

To provide a framework for the above discussion of the specific systems and methods described herein, an example database system using an ontology will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by an ontology. The conceptual data model is independent of any particular database used for durably storing one or more database(s) based on the ontology. For example, each object of the conceptual data model may correspond to one or more rows in a relational database or an entry in Lightweight Directory Access Protocol (LDAP) database, or any combination of one or more databases.

An ontology, as noted above, may include stored information providing a data model for storage of data in a database. The ontology may be defined by one or more object types, which may each be associated with one or more property types. At the highest level of abstraction, data object is a container for information representing things in the world. For example, data object can represent an entity such as a person, a place, an organization, or other noun. Data object can represent an event that happens at a point in time or for a duration. Data object can represent a document or other unstructured data source such as an e-mail message, a news report, or a written paper or article. Each data object is associated with a unique identifier that uniquely identifies the data object within the database system.

Different types of data objects may have different property types. For example, a "Person" data object might have an "Eye Color" property type and an "Event" data object might have a "Date" property type. Each property as represented by data in the database system may have a property type defined by the ontology used by the database.

Objects may be instantiated in the database in accordance with the corresponding object definition for the particular object in the ontology.

The data objects defined in the ontology may support property multiplicity. In particular, a data object may be allowed to have more than one property of the same property type. For example, a "Person" data object might have multiple "Address" properties or multiple "Name" properties.

Each link represents a connection between two data objects. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object can have multiple links with another data object to form a link set. For example, two "Person" data objects representing a husband and a wife could be linked through a "Spouse Of" relationship, a matching "Address" property, and one or more matching "Event" properties (e.g., a wedding). Each link as represented by data in a database may have a link type defined by the database ontology used by the database.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system configured to display a large amount of dynamically updating data, the computing system comprising:
    a network interface that is coupled to a data network for receiving and transmitting one or more packet flows;
    a computer processor; and
    a computer readable storage medium storing program instructions configured for execution by the computer processor in order to cause the computing system to:
        cause display of a communication in a view of a user interface;
        while an appearance of the communication in the view is modified as a clickless user interaction with the communication is occurring,
            receive a first selection of a tag in response to a first input, and
            receive a second selection of a second tag in response to a second input;
        update a data structure to indicate a link between the tag, the second tag, and the communication in response to receiving the first and second selections as the clickless user interaction is occurring; and
        cause an update to the display of the communication in the view to include a graphical representation of the first and second tags.

2. The computing system of claim 1, wherein the appearance of the communication in the view is modified to include a bolded border.

3. The computing system of claim 1, wherein the appearance of the communication in the view is modified from a first size to a second size that is larger than the first size.

4. The computing system of claim 3, wherein the modified appearance of the communication at least partially hides an appearance of a second communication in the view.

5. The computing system of claim 3, wherein the modified appearance of the communication fills the view.

6. The computing system of claim 5, process a selection of a second communication in response to a cursor moving over an area above the communication associated with the second communication.

7. The computing system of claim 1, wherein the tag is associated with a category, and wherein the second tag is associated with a sub-category of the category.

8. The computing system of claim 1, wherein the first selection is received via a cursor.

9. The computing system of claim 8, wherein the cursor comprises at least one of a mouse pointer or a finger of a user.

10. A computer-implemented method comprising:
    as implemented by one or more computer systems comprising computer hardware and memory, the one or more computer systems configured with specific executable instructions,
    causing display of a communication in a view of a user interface;
    while an appearance of the communication in the view is modified as a clickless user interaction with the communication is occurring,
        receiving a first selection of a tag in response to a first input, and
        receiving a second selection of a second tag in response to a second input;
    updating a data structure to indicate a link between the tag, the second tag, and the communication in response to receiving the first and second selections as the clickless user interaction is occurring; and
    causing an update to the display of the communication in the view to include a graphical representation of the first and second tags.

11. The computer-implemented method of claim 10, wherein the appearance of the communication in the view is modified to include a bolded border.

12. The computer-implemented method of claim 10, wherein the appearance of the communication in the view is modified from a first size to a second size that is larger than the first size.

13. The computer-implemented method of claim 12, wherein the modified appearance of the communication at least partially hides an appearance of a second communication in the view.

14. The computer-implemented method of claim 12, wherein the modified appearance of the communication fills the view.

15. The computer-implemented method of claim 14, process a selection of a second communication in response to a cursor moving over an area above the communication associated with the second communication.

16. The computer-implemented method of claim 10, wherein the tag is associated with a category, and wherein the second tag is associated with a sub-category of the category.

17. The computer-implemented method of claim 10, wherein the first selection is received via a cursor.

18. The computer-implemented method of claim 17, wherein the cursor comprises at least one of a mouse pointer or a finger of a user.

19. A non-transitory computer-readable medium comprising one or more program instructions recorded thereon, the instructions configured for execution by a computing system comprising one or more processors in order to cause the computing system to:
    cause display of a communication in a view of a user interface;
    while an appearance of the communication in the view is modified as a clickless user interaction with the communication is occurring,
        receive a first selection of a tag in response to a first input, and
        receive a second selection of a second tag in response to a second input;
    update a data structure to indicate a link between the tag, the second tag, and the communication in response to receiving the first and second selections as the clickless user interaction is occurring; and cause an update to the display of the communication in the view to include a graphical representation of the first and second tags.

20. The medium of claim 19, wherein the appearance of the communication in the view is modified from a first size to a second size that is larger than the first size.

\* \* \* \* \*